(12) United States Patent
Graham et al.

(10) Patent No.: US 11,654,547 B2
(45) Date of Patent: May 23, 2023

(54) EXTENSION TOOL

(71) Applicants: Oliver Crispin Robotics Limited, Altrincham (GB); General Electric Company, Schenectady, NY (US)

(72) Inventors: Andrew Crispin Graham, Badminton (GB); Tim Henri Ann Francois, Emersons Green (GB); Joanna Mechelle Jayawickrema, Mason, OH (US); Wayne Ray Grady, Hamilton, OH (US)

(73) Assignees: General Electric Company, Schenectady, NY (US); Oliver Crispin Robotics Limited, Altrincham (GB)

( * ) Notice: Subject to any disclaimer, the term of this patent is extended or adjusted under 35 U.S.C. 154(b) by 0 days.

(21) Appl. No.: 17/219,577

(22) Filed: Mar. 31, 2021

(65) Prior Publication Data

US 2022/0314430 A1 Oct. 6, 2022

(51) Int. Cl.
*B25J 9/06* (2006.01)
*B25J 9/08* (2006.01)
*B25J 9/10* (2006.01)
*B25J 18/06* (2006.01)
*B25J 19/00* (2006.01)

(52) U.S. Cl.
CPC ............ *B25J 9/065* (2013.01); *B25J 9/08* (2013.01); *B25J 9/1045* (2013.01); *B25J 18/06* (2013.01); *B25J 19/0054* (2013.01)

(58) Field of Classification Search
CPC ... B25J 9/065; B25J 9/08; B25J 9/1045; B25J 18/06; B25J 19/0054
See application file for complete search history.

(56) References Cited

U.S. PATENT DOCUMENTS

| 338,310 A | 3/1886 | Smith |
|---|---|---|
| 1,774,986 A | 9/1930 | Mackenzie |
| 1,987,972 A | 1/1935 | Rhein |
| 2,073,903 A | 3/1937 | Maurice |

(Continued)

FOREIGN PATENT DOCUMENTS

| CA | 2960352 A1 | 9/2017 |
|---|---|---|
| CA | 3077622 A1 | 4/2019 |

(Continued)

OTHER PUBLICATIONS

U.S. Appl. No. 16/696,025, filed Nov. 26, 2019.

(Continued)

*Primary Examiner* — Jake Cook
(74) *Attorney, Agent, or Firm* — Fitch, Even, Tabin & Flannery, LLP

(57) ABSTRACT

An extension tool has a proximal end and a distal end and comprises a plurality of sequentially arranged links moveable relative to one another and a support member defining the distal end and including a first wheel disposed at the distal end and a second wheel spaced apart from the first wheel. Additionally, or alternatively, an extension tool may comprise a plurality of windows defined in the plurality of sequentially arranged links. The windows are defined periodically along the plurality of sequentially arranged links such that a periodicity of the widows corresponds to a periodicity of a plurality of features of the component.

20 Claims, 7 Drawing Sheets

(56) References Cited

U.S. PATENT DOCUMENTS

| | | |
|---|---|---|
| 2,510,198 A | 6/1950 | Tesmer |
| 2,974,676 A | 3/1961 | Hagelthom |
| 3,096,962 A | 7/1963 | Meijs |
| 3,190,286 A | 6/1965 | Stokes |
| 3,266,059 A | 8/1966 | Stelle |
| 3,270,641 A | 9/1966 | Gosselin |
| 3,583,393 A | 6/1971 | Takahashi |
| 3,625,084 A | 12/1971 | Siebert |
| 3,778,170 A | 12/1973 | Howell |
| 4,035,137 A | 7/1977 | Arand |
| 4,041,695 A | 8/1977 | Harper |
| 4,095,418 A | 6/1978 | Mansson |
| 4,170,489 A | 10/1979 | Magnus |
| 4,227,584 A | 10/1980 | Driver |
| 4,242,863 A | 1/1981 | Bailey |
| 4,483,326 A | 11/1984 | Yamaka |
| 4,625,936 A | 12/1986 | Hadden, Sr. |
| 4,651,718 A | 3/1987 | Collins |
| 4,703,888 A | 11/1987 | Kawamura |
| 4,713,120 A | 12/1987 | Hodgens, II |
| 4,730,960 A | 3/1988 | Lewis |
| 4,773,395 A | 9/1988 | Suzuki |
| 4,790,294 A | 12/1988 | Allred, III |
| 4,790,624 A | 12/1988 | Van Hoye |
| 4,826,087 A | 5/1989 | Chinery |
| 4,846,573 A | 7/1989 | Taylor |
| 4,890,602 A | 1/1990 | Hake |
| 4,911,206 A | 3/1990 | Gropp |
| 4,972,048 A | 11/1990 | Martin |
| 5,090,205 A | 2/1992 | Foster |
| 5,102,221 A | 4/1992 | Desgranges |
| 5,203,646 A | 4/1993 | Landsberger |
| 5,254,809 A | 10/1993 | Martin |
| 5,271,382 A | 12/1993 | Chikama |
| 5,323,962 A | 6/1994 | Jassby |
| 5,337,733 A | 8/1994 | Bauerfeind |
| 5,339,845 A | 8/1994 | Huddas |
| 5,372,162 A | 12/1994 | Frey |
| 5,385,102 A | 1/1995 | Villedieu |
| 5,390,402 A | 2/1995 | White et al. |
| 5,399,164 A | 3/1995 | Snoke |
| 5,408,970 A | 4/1995 | Burkhard |
| 5,482,029 A | 1/1996 | Sekiguchi |
| 5,501,156 A | 3/1996 | Richter |
| 5,644,394 A | 7/1997 | Owens |
| 5,667,023 A | 9/1997 | Harrell |
| 5,787,897 A | 8/1998 | Kieturakis |
| 5,807,241 A | 9/1998 | Heimberger |
| 5,816,769 A | 10/1998 | Bauer |
| 6,123,273 A | 9/2000 | Loprinzo |
| 6,156,974 A | 12/2000 | Blase |
| 6,213,974 B1 | 4/2001 | Smith |
| 6,216,439 B1 | 4/2001 | Nakamoto |
| 6,287,206 B1 | 9/2001 | Stage |
| 6,311,704 B1 | 11/2001 | Foster |
| 6,371,148 B1 | 4/2002 | Tripp |
| 6,431,824 B2 | 8/2002 | Schotsch et al. |
| 6,432,046 B1 | 8/2002 | Yarush |
| 6,478,033 B1 | 11/2002 | Foster |
| 6,481,195 B1 | 11/2002 | Blase |
| 6,542,230 B1 | 4/2003 | Luke |
| 6,643,877 B1 | 11/2003 | Amtenbrink |
| 6,698,456 B2 | 3/2004 | Neubauer |
| 6,783,491 B2 | 8/2004 | Saadat |
| 6,837,846 B2 | 1/2005 | Jaffe |
| 6,941,974 B2 | 9/2005 | Utaki |
| 6,943,570 B2 | 9/2005 | Duffy |
| 6,955,023 B2 | 10/2005 | Rotheroe |
| 6,957,781 B2 | 10/2005 | Gowens |
| 6,974,411 B2 | 12/2005 | Belson |
| 7,150,416 B2 | 12/2006 | Martin |
| 7,171,279 B2 | 1/2007 | Buckingham |
| 7,182,024 B2 | 2/2007 | Pfeiffer |
| 7,182,025 B2 | 2/2007 | Ghorbel et al. |
| 7,185,407 B2 | 3/2007 | Boyl-Davis |
| 7,258,521 B2 | 8/2007 | Guerra |
| 7,509,735 B2 | 3/2009 | Philip |
| 7,559,340 B2 | 7/2009 | Ikeda |
| 7,571,735 B2 | 8/2009 | Wagner |
| 7,677,181 B2 | 3/2010 | Boyl-Davis |
| 7,703,272 B2 | 4/2010 | Wagner |
| 7,707,704 B2 | 5/2010 | Crocker et al. |
| 7,712,301 B1 | 5/2010 | Wagner |
| 7,718,894 B2 | 5/2010 | Blase |
| 7,741,563 B2 | 6/2010 | Harada |
| 7,849,878 B2 | 12/2010 | Kohler |
| 7,854,109 B2 | 12/2010 | Zubiate |
| 7,883,674 B2 | 2/2011 | Huang |
| 8,096,030 B2 | 1/2012 | Graichen |
| 8,125,755 B2 | 2/2012 | Garcia |
| 8,152,934 B2 | 4/2012 | Lee |
| 8,206,488 B2 | 6/2012 | Mantkowski |
| 8,303,243 B2 | 11/2012 | Fish |
| 8,327,518 B2 | 12/2012 | Koerner |
| 8,374,722 B2 | 2/2013 | Buckingham |
| 8,377,232 B2 | 2/2013 | Myers |
| 8,400,501 B2 | 3/2013 | Heyworth |
| 8,409,248 B2 | 4/2013 | Ginn |
| 8,453,533 B2 | 6/2013 | Ryland |
| 8,505,204 B2 | 8/2013 | Reverchon |
| 8,571,711 B2 | 10/2013 | Jacobsen |
| 8,635,849 B2 | 1/2014 | Tassone |
| 8,674,222 B2 | 3/2014 | Hsieh |
| 8,758,232 B2 | 6/2014 | Graham |
| 8,920,579 B2 | 12/2014 | Liedtke |
| 8,945,096 B2 | 2/2015 | Zubiate |
| 8,959,902 B2 | 2/2015 | Olivier |
| 8,991,163 B2 | 3/2015 | Olivier |
| 8,992,421 B2 | 3/2015 | Stand |
| 8,998,567 B2 | 4/2015 | Scipio |
| 9,016,159 B2 | 4/2015 | Kell |
| 9,016,293 B2 | 4/2015 | Battaglioli |
| 9,028,618 B2 | 5/2015 | Battaglioli |
| 9,127,234 B2 | 9/2015 | Hughes |
| 9,149,929 B2 | 10/2015 | Motzer |
| 9,187,700 B2 | 11/2015 | Huang |
| 9,220,398 B2 | 12/2015 | Woodley |
| 9,263,866 B2 | 2/2016 | Shimizu |
| 9,294,737 B2 | 3/2016 | Hatcher, Jr. |
| 9,329,377 B2 | 5/2016 | Kell |
| 9,399,299 B2 | 7/2016 | Hermey |
| 9,403,244 B2 | 8/2016 | Rautenberg |
| 9,409,292 B2 | 8/2016 | Smith |
| 9,435,750 B2 | 9/2016 | Matsumoto |
| 9,458,735 B1 | 10/2016 | Diwinsky |
| 9,492,906 B2 | 11/2016 | Rösing |
| 9,505,125 B2 | 11/2016 | Zubiate |
| 9,549,663 B2 | 1/2017 | Larkin |
| 9,733,195 B2 | 8/2017 | Colletti |
| 9,778,141 B2 | 10/2017 | Bancalari |
| 9,788,141 B2 | 10/2017 | Ponec |
| 9,857,002 B2 | 1/2018 | Ott |
| 9,902,024 B2 | 2/2018 | Ernst |
| 9,909,694 B2 | 3/2018 | Graham |
| 9,951,647 B2 | 4/2018 | Rawson |
| 10,060,569 B2 | 8/2018 | Sivacoe |
| 10,085,624 B2 | 10/2018 | Isoda |
| 10,197,473 B2 | 2/2019 | Diwinsky |
| 10,213,919 B2 | 2/2019 | Axinte |
| 10,238,457 B2 | 3/2019 | Herrell |
| 10,265,810 B2 | 4/2019 | Diwinsky |
| 10,428,993 B2 | 10/2019 | Whitefield |
| 10,470,831 B2 | 11/2019 | Cohen |
| 10,884,232 B1 | 1/2021 | Trivedi |
| 10,926,403 B1 | 2/2021 | Asokan |
| 10,962,345 B2 | 3/2021 | Graham |
| 10,967,504 B2 | 4/2021 | Simaan |
| 11,371,437 B2 | 6/2022 | Hawke |
| 11,413,763 B2 | 8/2022 | Lee |
| 2003/0171736 A1 | 9/2003 | Bon |
| 2003/0229420 A1 | 12/2003 | Buckingham |
| 2004/0138525 A1 | 7/2004 | Saadat |
| 2004/0186350 A1 | 9/2004 | Brenneman |
| 2004/0249367 A1 | 12/2004 | Saadat |

(56) References Cited

U.S. PATENT DOCUMENTS

| | | |
|---|---|---|
| 2004/0255422 A1 | 12/2004 | Reback |
| 2005/0075538 A1 | 4/2005 | Banik |
| 2005/0107667 A1 | 5/2005 | Danitz |
| 2005/0124856 A1 | 6/2005 | Fujikura |
| 2005/0148287 A1 | 7/2005 | Moeller |
| 2005/0203340 A1 | 9/2005 | Butler |
| 2005/0204489 A1 | 9/2005 | Velez |
| 2005/0273085 A1 | 12/2005 | Hinman |
| 2006/0073348 A1 | 4/2006 | Farmer |
| 2006/0074283 A1 | 4/2006 | Henderson |
| 2006/0074383 A1 | 4/2006 | Boulais |
| 2006/0131908 A1 | 6/2006 | Tadano |
| 2006/0156851 A1 | 7/2006 | Jacobsen |
| 2006/0170386 A1 | 8/2006 | Anhalt |
| 2006/0258265 A1 | 11/2006 | Moeller |
| 2008/0066821 A1 | 3/2008 | Komiya |
| 2008/0149141 A1 | 6/2008 | Sales |
| 2008/0161971 A1 | 7/2008 | Buckingham |
| 2008/0199304 A1 | 8/2008 | Moran |
| 2008/0250769 A1 | 10/2008 | Wagner |
| 2009/0084108 A1 | 4/2009 | Prociw |
| 2009/0084408 A1 | 4/2009 | Thiemann |
| 2009/0084411 A1 | 4/2009 | Woodcock |
| 2009/0216245 A1 | 8/2009 | Viola |
| 2009/0255102 A1 | 10/2009 | Mcmasters |
| 2009/0255116 A1 | 10/2009 | Mcmasters |
| 2009/0256007 A1 | 10/2009 | Mcmasters |
| 2009/0320891 A1 | 12/2009 | Liedtke |
| 2010/0030377 A1 | 2/2010 | Unsworth |
| 2010/0037924 A1 | 2/2010 | Gebhardt |
| 2010/0108107 A1 | 5/2010 | Mantkowski |
| 2010/0116292 A1 | 5/2010 | Wagner |
| 2010/0147330 A1 | 6/2010 | Kohler |
| 2010/0160736 A1 | 6/2010 | Padget |
| 2010/0234988 A1 | 9/2010 | Buckingham |
| 2010/0256447 A1 | 10/2010 | Dubi |
| 2011/0174108 A1 | 7/2011 | Graham |
| 2011/0303053 A1 | 12/2011 | Schneider |
| 2011/0313243 A1 | 12/2011 | Zubiate |
| 2012/0067158 A1 | 3/2012 | Kell |
| 2012/0125164 A1 | 5/2012 | Kozak |
| 2012/0167547 A1 | 7/2012 | Zhang |
| 2012/0184817 A1 | 7/2012 | Sugiyama |
| 2012/0197241 A1 | 8/2012 | Golden |
| 2012/0260497 A1 | 10/2012 | White |
| 2012/0312103 A1 | 12/2012 | Hannott et al. |
| 2013/0074879 A1 | 3/2013 | Battaglioli |
| 2013/0125753 A1 | 5/2013 | Ono |
| 2013/0192353 A1 | 8/2013 | Hatcher |
| 2013/0199040 A1 | 8/2013 | Dudeck |
| 2013/0226033 A1 | 8/2013 | Eskuri |
| 2013/0255410 A1 | 10/2013 | Lee |
| 2013/0335530 A1 | 12/2013 | Hatcher, Jr. |
| 2013/0340559 A1 | 12/2013 | Danitz |
| 2014/0005683 A1 | 1/2014 | Stand |
| 2014/0012288 A1 | 1/2014 | Darisse |
| 2014/0055596 A1 | 2/2014 | Hatcher, Jr. |
| 2014/0125791 A1 | 5/2014 | Arellano |
| 2014/0260755 A1 | 9/2014 | Dong |
| 2015/0036150 A1 | 2/2015 | Kobayashi |
| 2015/0159557 A1 | 6/2015 | Scipio |
| 2015/0233263 A1 | 8/2015 | Battaglioli |
| 2015/0300920 A1 | 10/2015 | Deascanis |
| 2015/0338353 A1 | 11/2015 | Bancalari |
| 2015/0341600 A1 | 11/2015 | Hatcher, Jr. |
| 2015/0360629 A1 | 12/2015 | Sekino |
| 2016/0032761 A1 | 2/2016 | Griffiths |
| 2016/0040803 A1 | 2/2016 | Steeger |
| 2016/0146036 A1 | 5/2016 | Richter |
| 2016/0174816 A1 | 6/2016 | Choset |
| 2016/0186602 A1 | 6/2016 | Saenz |
| 2016/0339584 A1 | 11/2016 | Esteban Finck |
| 2017/0023154 A1 | 1/2017 | Jaeker |
| 2017/0095922 A1 | 4/2017 | Licht |
| 2017/0100197 A1 | 4/2017 | Zubiate |
| 2017/0129110 A1 | 5/2017 | Ohm |
| 2017/0167289 A1 | 6/2017 | Diwinsky |
| 2017/0167953 A1 | 6/2017 | Diwinsky |
| 2017/0175569 A1 | 6/2017 | Rawson |
| 2017/0191376 A1 | 7/2017 | Eriksen |
| 2017/0219814 A1 | 8/2017 | Letter |
| 2017/0219815 A1 | 8/2017 | Letter |
| 2017/0239762 A1 | 8/2017 | Roberts |
| 2017/0274484 A1 | 9/2017 | Roberts |
| 2017/0319048 A1 | 11/2017 | Ikeda |
| 2017/0328497 A1 | 11/2017 | Dantin |
| 2017/0361470 A1 | 12/2017 | Otero Del Real |
| 2018/0058233 A1 | 3/2018 | Norton |
| 2018/0094538 A1 | 4/2018 | Tibbetts |
| 2018/0119568 A1 | 5/2018 | Negoescu |
| 2018/0149038 A1 | 5/2018 | Eriksen |
| 2018/0156062 A1 | 6/2018 | Dede |
| 2018/0156132 A1 | 6/2018 | Dede |
| 2018/0231162 A1 | 8/2018 | Zeng |
| 2018/0313225 A1 | 11/2018 | Millhaem |
| 2018/0361960 A1 | 12/2018 | Yamamoto |
| 2019/0022877 A1 | 1/2019 | Akin |
| 2019/0046010 A1 | 2/2019 | Ryo |
| 2019/0054638 A1 | 2/2019 | Norton |
| 2019/0190190 A1 | 6/2019 | Bourgeas |
| 2019/0246878 A1 | 8/2019 | Bodner |
| 2019/0277770 A1 | 9/2019 | Mekala |
| 2019/0308319 A1 | 10/2019 | Walters |
| 2019/0358833 A1 | 11/2019 | Graham |
| 2019/0360794 A1 | 11/2019 | Graham et al. |
| 2019/0366536 A1 | 12/2019 | Graham |
| 2019/0383158 A1 | 12/2019 | Diwinsky |
| 2019/0383161 A1 | 12/2019 | Graham |
| 2020/0113412 A1 | 4/2020 | Jensen |
| 2020/0114497 A1 | 4/2020 | Graham |
| 2020/0114528 A1 | 4/2020 | Graham |
| 2020/0224552 A1 | 7/2020 | Millhaem |
| 2020/0316789 A1 | 10/2020 | Sohmshetty |
| 2020/0319119 A1 | 10/2020 | Peters |
| 2020/0359879 A1 | 11/2020 | Cahill |
| 2020/0405142 A1 | 12/2020 | Whitaker |
| 2021/0078165 A1* | 3/2021 | Tang ............... B25J 9/065 |
| 2021/0102870 A1 | 4/2021 | Trivedi |
| 2021/0137354 A1 | 5/2021 | Bob |
| 2021/0223142 A1 | 7/2021 | Sasaki |
| 2021/0229269 A1 | 7/2021 | Graham |
| 2021/0229270 A1 | 7/2021 | Graham |
| 2021/0231239 A1 | 7/2021 | Graham |
| 2021/0285374 A1 | 9/2021 | Hawke |
| 2021/0388737 A1 | 12/2021 | Foxall |
| 2022/0221706 A1 | 7/2022 | Trivedi |
| 2022/0221707 A1 | 7/2022 | Trivedi |
| 2022/0290608 A1 | 9/2022 | Hawke |

FOREIGN PATENT DOCUMENTS

| | | |
|---|---|---|
| CA | 3043720 A1 | 11/2019 |
| CN | 86101283 A | 8/1986 |
| CN | 1050781 C | 3/2000 |
| CN | 1656312 | 8/2005 |
| CN | 101528111 A | 9/2009 |
| CN | 101881218 | 11/2010 |
| CN | 201800016 | 4/2011 |
| CN | 102292013 A | 12/2011 |
| CN | 102711585 | 10/2012 |
| CN | 203370761 U | 1/2014 |
| CN | 103895012 A | 7/2014 |
| CN | 104582909 A | 4/2015 |
| CN | 103639156 B | 7/2015 |
| CN | 105436127 A | 3/2016 |
| CN | 106163431 | 11/2016 |
| CN | 106427289 A | 2/2017 |
| CN | 106659438 | 5/2017 |
| CN | 106988798 | 7/2017 |
| CN | 107468339 A | 12/2017 |
| CN | 108472025 | 8/2018 |
| CN | 109068938 | 12/2018 |
| CN | 110001286 | 7/2019 |
| DE | 29902753 U | 6/1999 |

(56) References Cited

FOREIGN PATENT DOCUMENTS

| | | | |
|---|---|---|---|
| DE | 102019002892 A1 | 10/2020 | |
| DE | 102020106508 | 9/2021 | |
| EP | 1216797 A1 | 6/2002 | |
| EP | 1489269 A2 | 12/2004 | |
| EP | 1574675 A2 | 9/2005 | |
| EP | 2011619 A2 | 1/2009 | |
| EP | 1914010 A3 | 9/2010 | |
| EP | 2237931 A1 | 10/2010 | |
| EP | 2267508 | 12/2010 | |
| EP | 1967295 B1 | 1/2011 | |
| EP | 2320262 | 5/2011 | |
| EP | 2052792 A3 | 6/2011 | |
| EP | 2353739 A1 | 8/2011 | |
| EP | 2286933 B1 | 11/2011 | |
| EP | 2275648 B1 | 3/2012 | |
| EP | 1903188 B1 | 5/2013 | |
| EP | 2597273 A2 | 5/2013 | |
| EP | 2629655 | 8/2013 | |
| EP | 3061923 A1 | 8/2016 | |
| EP | 3072642 A2 | 9/2016 | |
| EP | 1908928 B1 | 12/2016 | |
| EP | 3153604 A1 | 4/2017 | |
| EP | 3176365 A1 | 6/2017 | |
| EP | 3572632 A1 | 11/2019 | |
| FR | 2956608 A1 * | 8/2011 | ............ B08B 9/045 |
| FR | 2995996 A1 | 3/2014 | |
| FR | 3082136 A1 | 12/2019 | |
| GB | 779248 | 7/1957 | |
| GB | 1437405 A | 5/1976 | |
| GB | 2199842 | 7/1988 | |
| GB | 2228644 A | 8/1990 | |
| MX | 2010013223 A1 | 12/2010 | |
| WO | 0006336 A1 | 2/2000 | |
| WO | 2009081164 A1 | 7/2009 | |
| WO | 2011092891 | 8/2011 | |
| WO | 2012042921 A1 | 4/2012 | |
| WO | 2012054829 A2 | 4/2012 | |
| WO | WO-2016063074 A2 * | 4/2016 | ............ B05B 12/00 |
| WO | WO201801967 A1 | 1/2018 | |
| WO | 2019076876 A1 | 4/2019 | |
| WO | 2019097688 | 5/2019 | |
| WO | 2021040376 A1 | 3/2021 | |

OTHER PUBLICATIONS

U.S. Appl. No. 16/750,665, filed Jan. 23, 2020.
U.S. Appl. No. 16/750,743, filed Jan. 23, 2020.
U.S. Appl. No. 16/751,802, filed Jan. 24, 2020.
U.S. Appl. No. 16/813,829, filed Mar. 10, 2020.
U.S. Appl. No. 16/898,629, filed Jun. 11, 2020.
U.S. Appl. No. 17/144,487, filed Jan. 8, 2021.
U.S. Appl. No. 16/735,191; Notice of Allowance and Fees Due (PTOL-85) dated Dec. 8, 2022; (pp. 1-8).
FET20 (Wireless Borescope, Klein Tools, Jan. 2019) (Year: 2019).
Huang et al., In-Situ Continuous Coke Deposit Removal by Catalytic Steam Gasification for Fuel-Cooled Thermal Management, Journal of Engineering for Gas Turbines and Power, vol. 134, Oct. 2012, 8 Pages.
Mascarenas et al., "A Compliant Mechanism for Inspecting Extremely Confined Spaces" Smart Materials and Structures, vol. No. 26, pp. 1-16, Oct. 26, 2017.
Mascarenas, et al., A compliant mechanism for inspecting extremely confined spaces, Smart Materials and Structures, Oct. 26, 2017, vol. 26, 26 pgs.
U.S. Appl. No. 15/986,958, filed May 23, 2018.
U.S. Final Office Action from U.S. Appl. No. 15/986,958 dated Sep. 9, 2020, 10 pgs.
U.S. Non-Final Office Action from U.S. Appl. No. 15/986,958 dated Apr. 23, 2020,12 pgs.
U.S. Notice of Allowance and Notice of Allowability, dated Nov. 18, 2020, from U.S. Appl. No. 15/986,958, 9 pgs.
U.S. Appl. No. 16/751,802; Non-Final Rejection dated Feb. 28, 2022; (pp. 1-12).
U.S. Appl. No. 16/750,743; Non-Final Rejection dated Apr. 27, 2022; (pp. 1-12).
U.S. Appl. No. 16/577,331; Non-Final Rejection dated Jan. 19, 2022; (pp. 1-8).
U.S. Appl. No. 16/577,331; Notice of Allowance and Fees Due (PTOL-85) dated Jul. 25, 2022; (pp. 1-5).
U.S. Appl. No. 16/577,331; Notice of Allowance and Fees Due (PTOL-85) dated Nov. 7, 2022; (pp. 1-5).
U.S. Appl. No. 16/577,331; Notice of Allowance and Fees Due (PTOL-85) dated Nov. 7, 2022; (pp. 1-16).
U.S. Appl. No. 16/696,025; Final Rejection dated Sep. 16, 2022; (pp. 1-34).
U.S. Appl. No. 16/735,191; Non-Final Rejection dated Aug. 3, 2022; (pp. 1-11).
U.S. Appl. No. 16/750,665; Non-Final Rejection dated Jul. 20, 2022; (pp. 1-9).
U.S. Appl. No. 16/750,665; Notice of Allowance and Fees Due (PTOL-85) dated Nov. 17, 2022; (pp. 1-5).
U.S. Appl. No. 16/750,743; Final Rejection dated Nov. 7, 2022; (pp. 1-13).
U.S. Appl. No. 16/750,743; Final Rejection dated Nov. 7, 2022; (pp. 1-28).
U.S. Appl. No. 16/751,802; Final Rejection dated Jul. 28, 2022; (pp. 1-9).
U.S. Appl. No. 16/751,802; Notice of Allowance and Fees Due (PTOL-85) dated Oct. 19, 2022; (pp. 1-7).
U.S. Appl. No. 16/898,629; Non-Final Rejection dated Sep. 13, 2022; (pp. 1-14).
U.S. Appl. No. 17/144,487; Non-Final Rejection dated Aug. 23, 2022; (pp. 1-6).
Wickham et al., High Heat Flux Surface Coke Deposition and Removal Assessment, Technical Paper, Air Force Research Laboratory, Edwards AFB, Jan. 2015, California, 21 Pages.
USPTO; U.S. Appl. No. 16/751,802; Supplemental Notice of Allowance dated Feb. 27, 2023; (pp. 1-4).
USPTO; U.S. Appl. No. 16/577,268; Non-Final Rejection dated Jan. 20, 2023; (pp. 1-29).
USPTO; U.S. Appl. No. 16/577,331; Notice of Allowance and Fees Due (PTOL-85) dated Feb. 15, 2023; (pp. 1-5).
USPTO; U.S. Appl. No. 16/696,025; Non-Final Rejection dated Mar. 28, 2023; (pp. 1-29).
USPTO; U.S. Appl. No. 16/735,191; Notice of Allowance and Fees Due (PTOL-85) dated Mar. 27, 2023; (pp. 1-5).
USPTO; U.S. Appl. No. 16/750,665; Notice of Allowance and Fees Due (PTOL-85) dated Mar. 24, 2023; (pp. 1-6).
USPTO; U.S. Appl. No. 16/750,743; Notice of Allowance and Fees Due (PTOL-85) dated Jan. 23, 2023; (pp. 1-5).
USPTO; U.S. Appl. No. 16/751,802; Notice of Allowance and Fees Due (PTOL-85) dated Feb. 6, 2023; (pp. 1-5).
USPTO; U.S. Appl. No. 16/898,629; Final Rejection dated Feb. 28, 2023; (pp. 1-22).
USPTO; U.S. Appl. No. 17/144,487; Non-Final Rejection dated Mar. 22, 2023; (pp. 1-6).

* cited by examiner

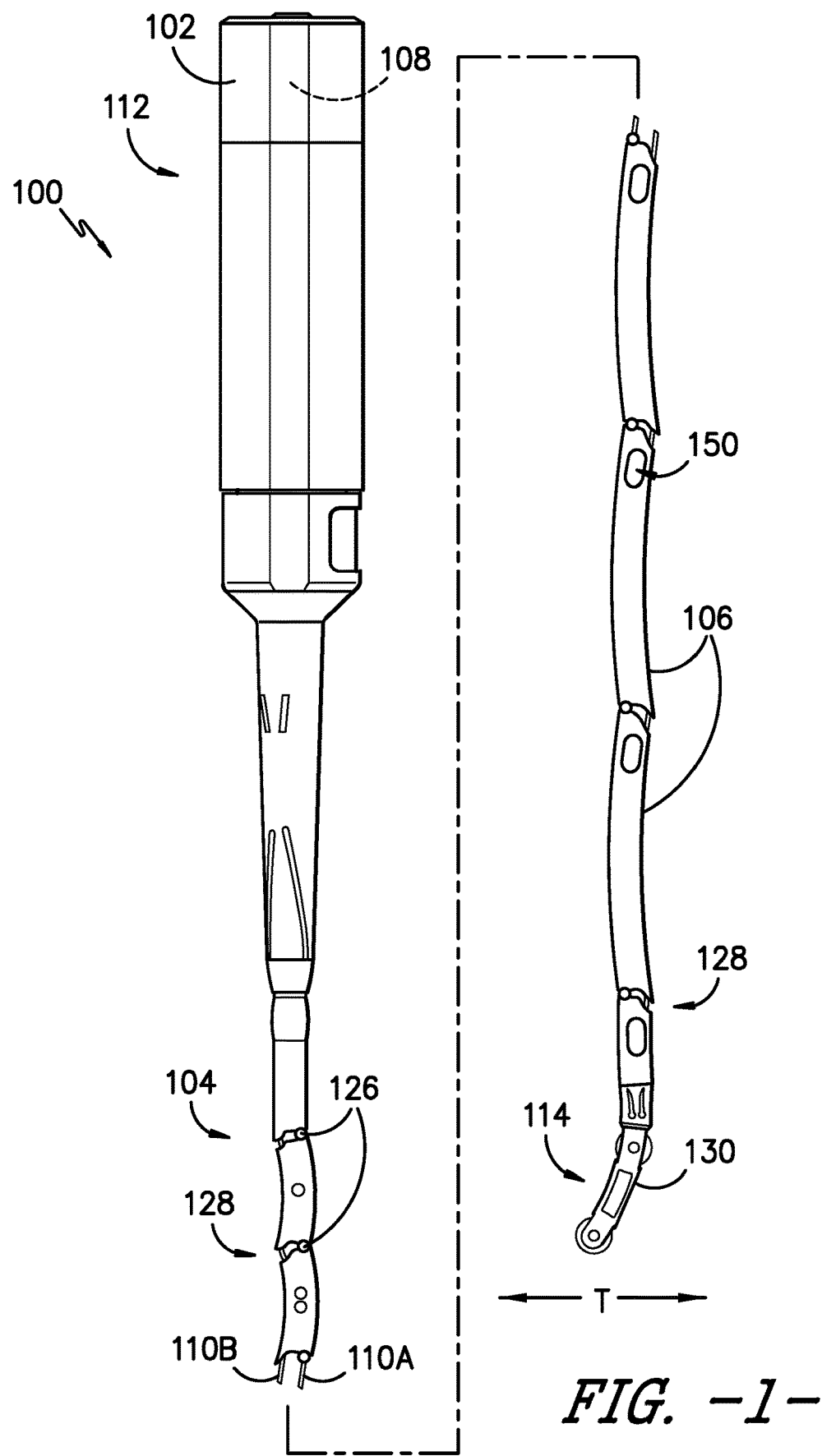
FIG. -1-

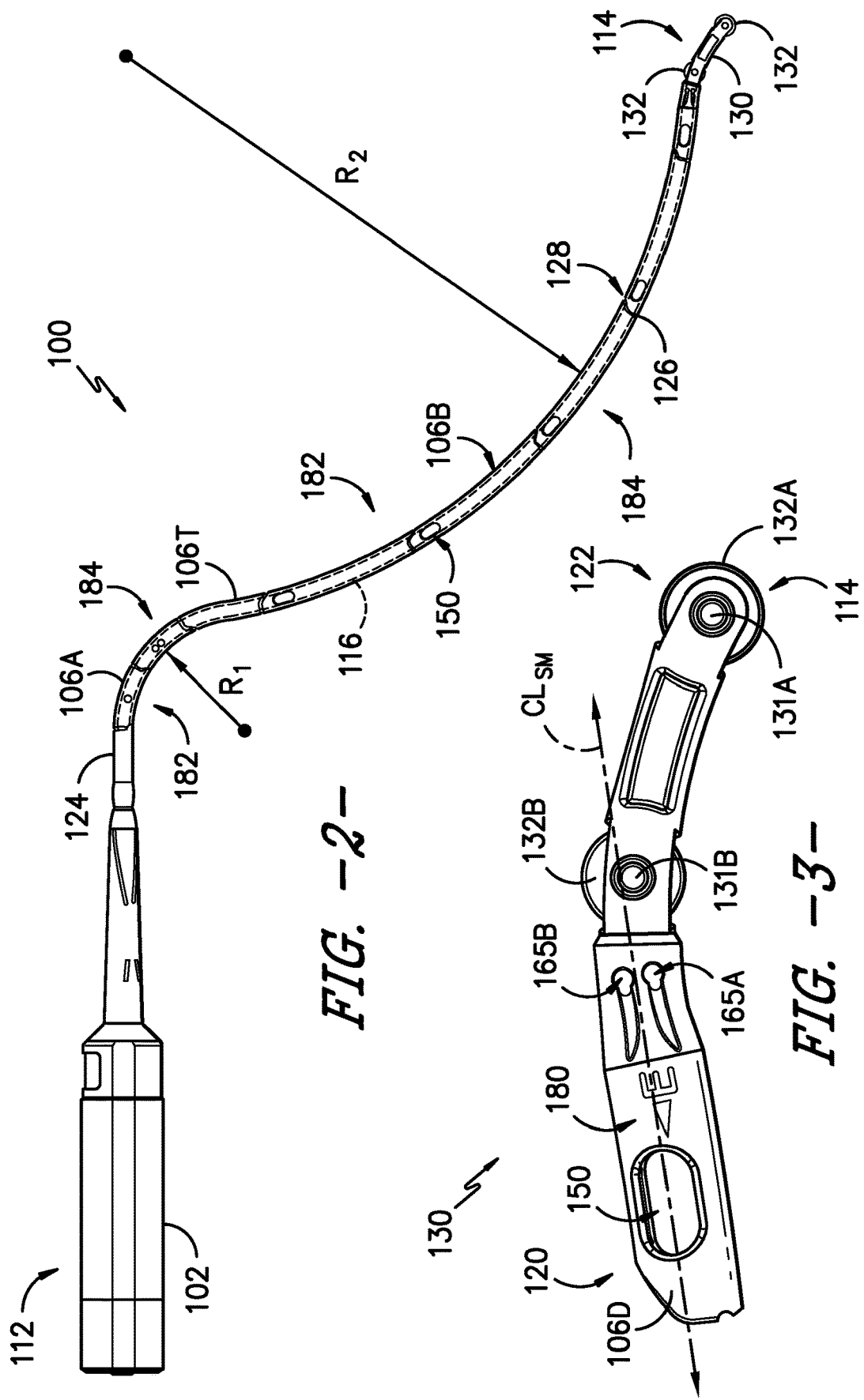

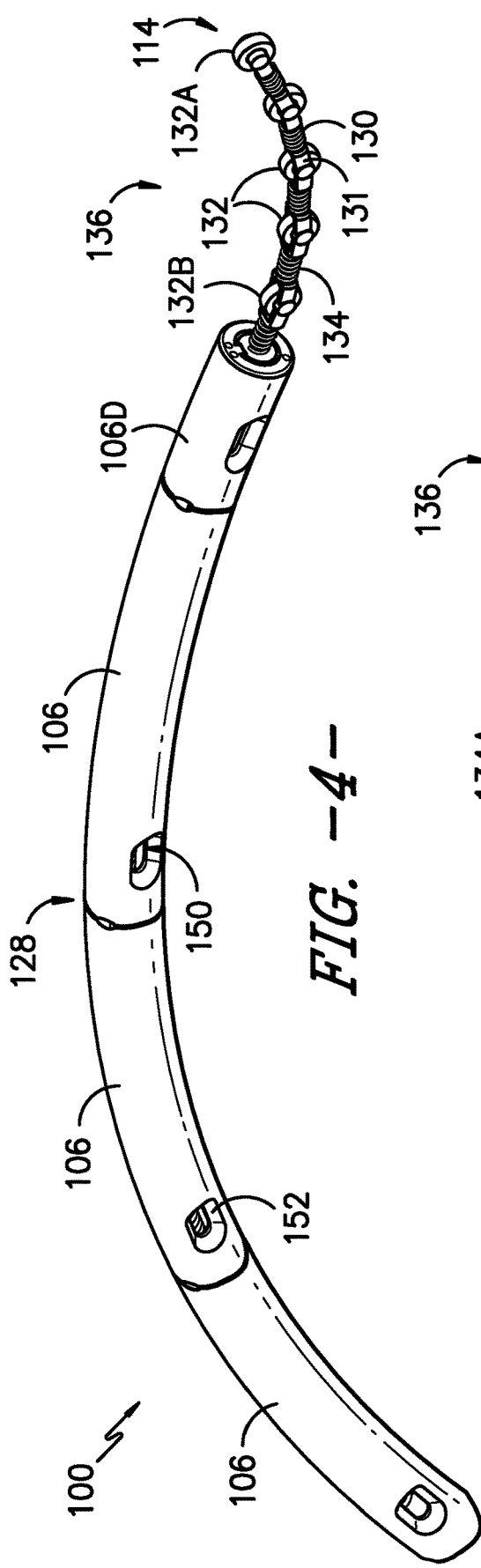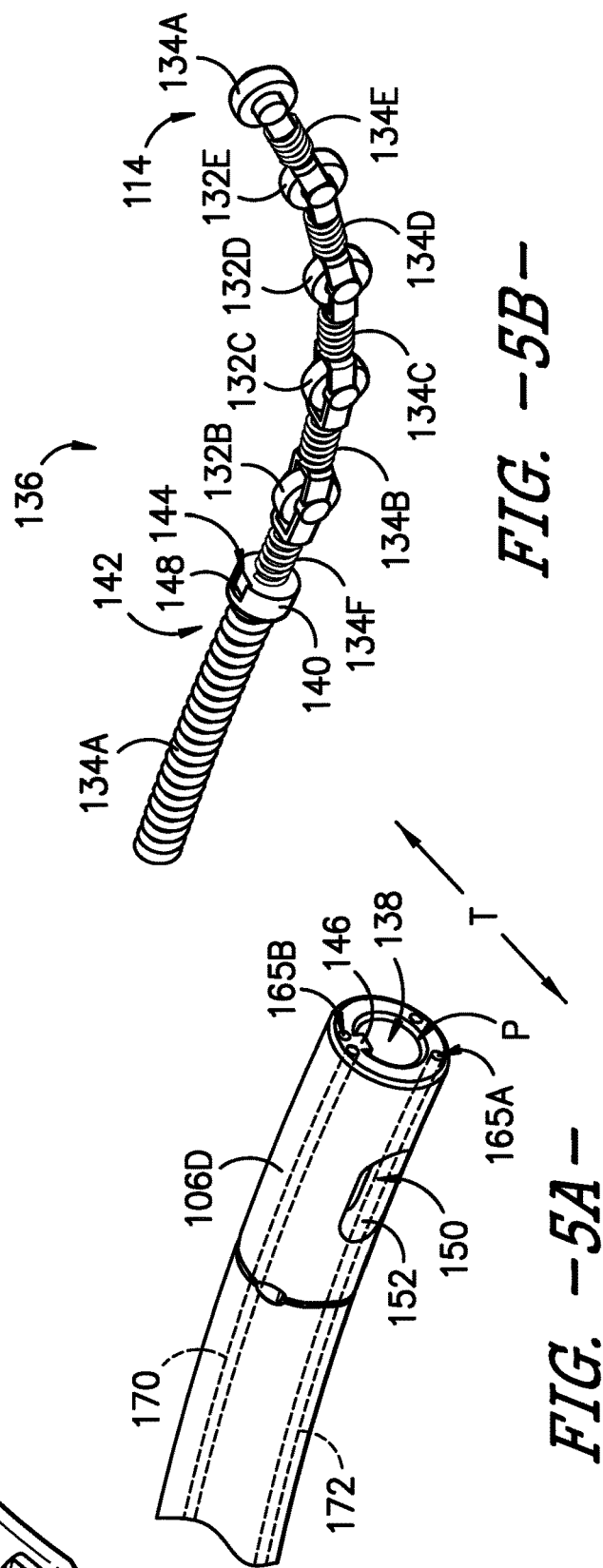

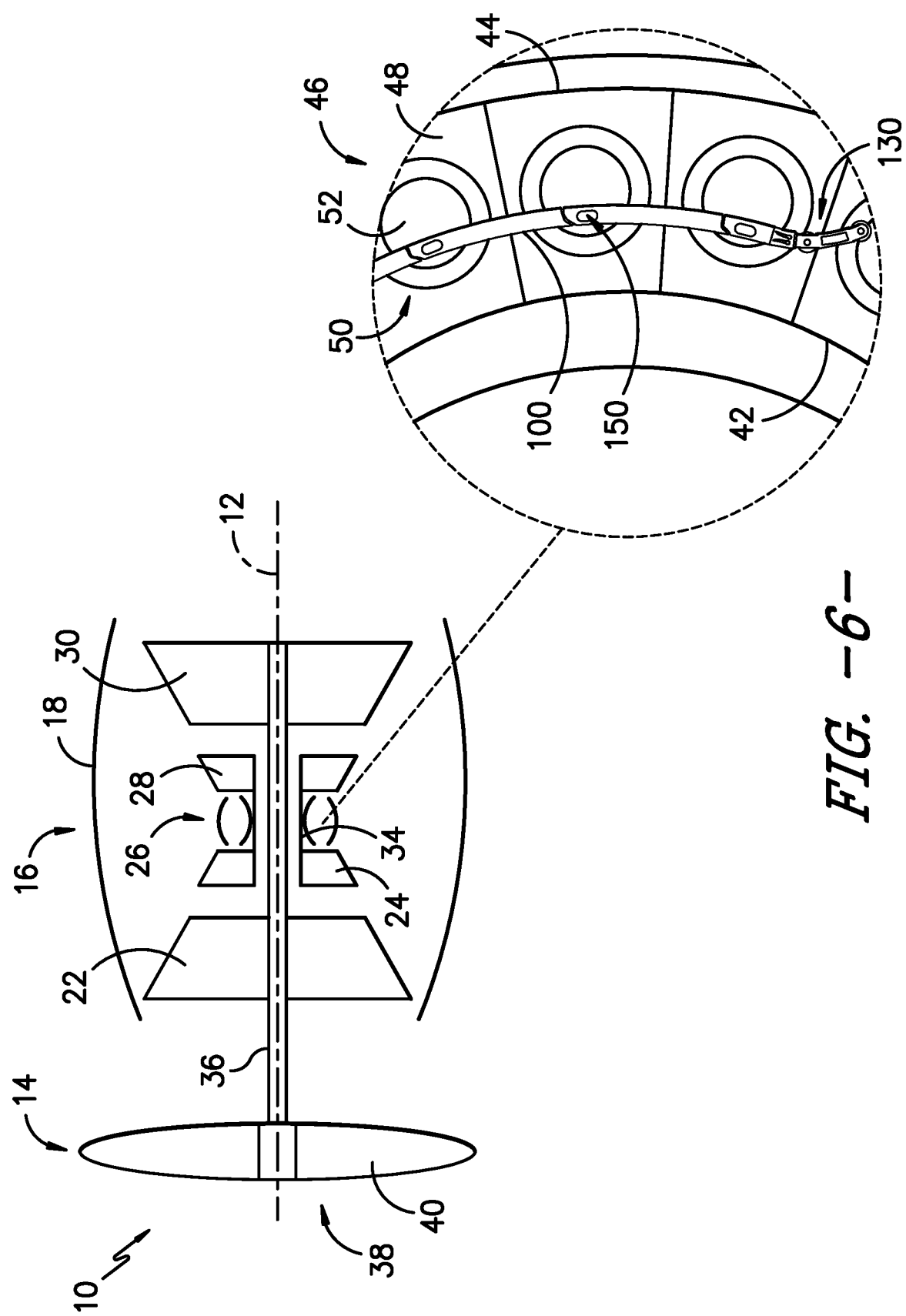
FIG. -6-

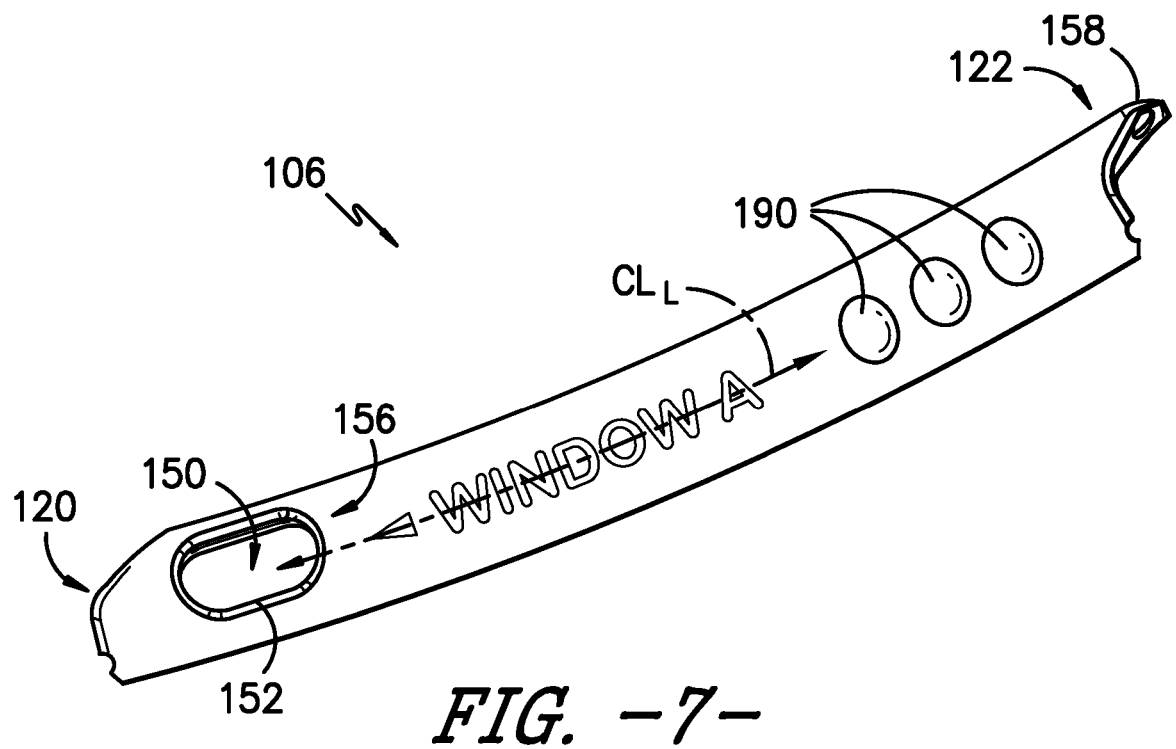
FIG. -7-
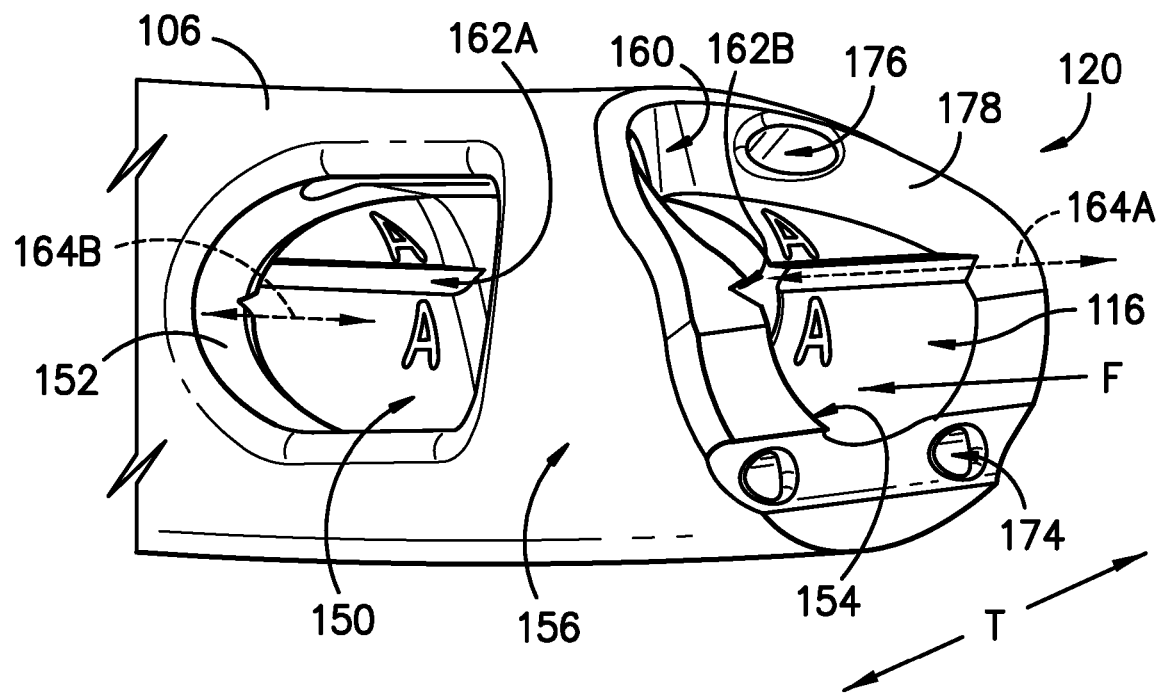
FIG. -8-

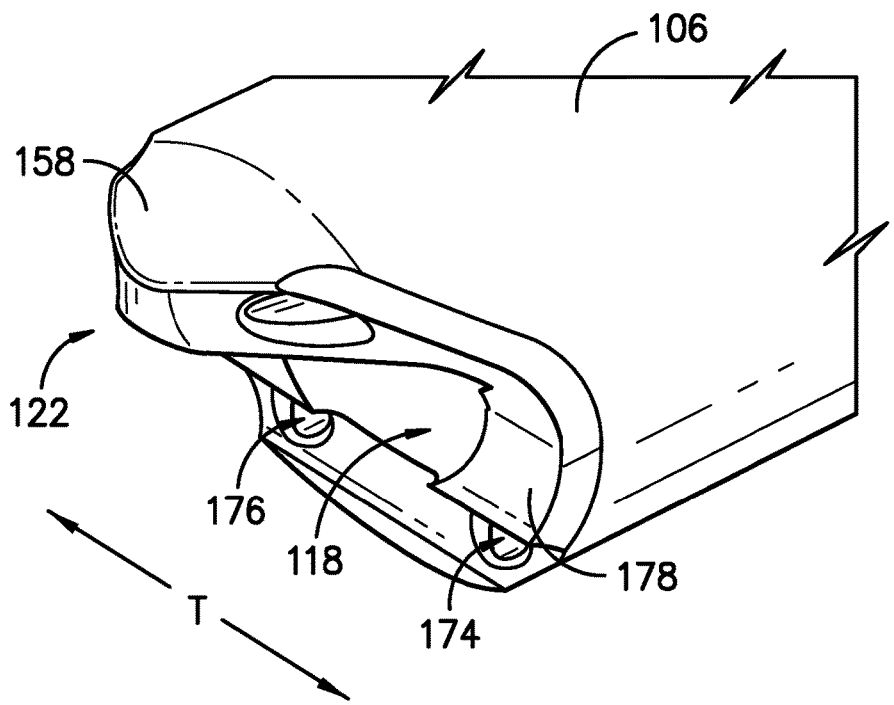
FIG. -9-
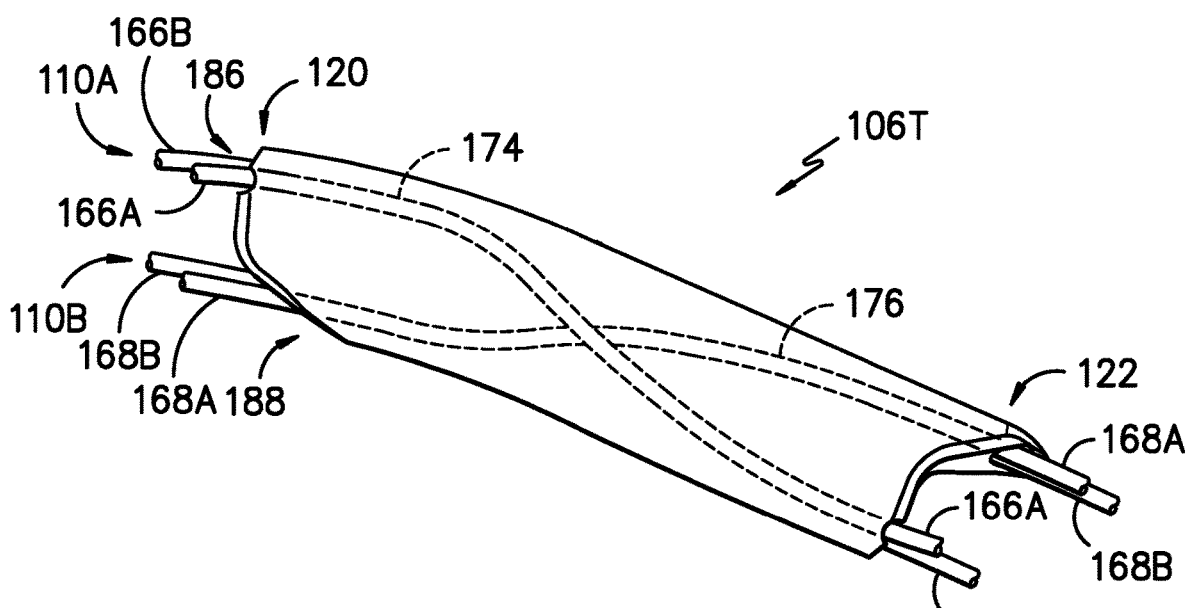
FIG. -10-

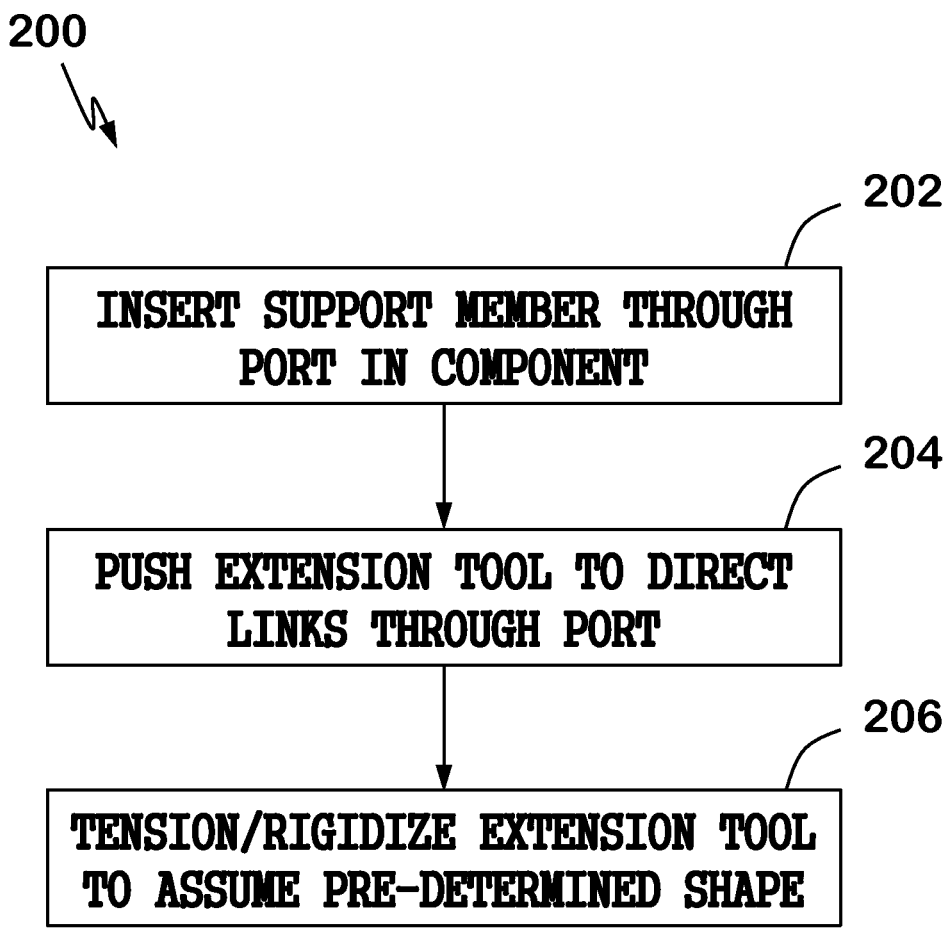
FIG. -11-

EXTENSION TOOL

FIELD

The present subject matter generally relates to a tool for inspecting an environment and/or performing maintenance, cleaning, or other operations within the environment.

BACKGROUND

Robotic arm assemblies are useful throughout various industries for performing operations at, e.g., remote locations, hazardous locations, etc. At least certain robotic arm assemblies include a robotic arm formed of a plurality of links joined together at respective joints. Additionally, a plurality of control wires may extend through the robotic arm, with each wire terminating at an individual link for moving such link relative to an aft-adjacent link. The control wires may be coupled to one or more motors within a base of the robotic arm assembly, such that the robotic arm assembly may control a movement of the robotic arm by increasing and/or decreasing tension on the plurality of control wires.

In such a manner, robotic arms may be useful in reaching out-of-sight locations within various environments. However, robotic arms may generally be cost prohibitive and/or more complicated than desired for certain applications. Accordingly, a tool that may allow for a user to reach remote locations within an environment in a more cost efficient manner would be useful.

BRIEF DESCRIPTION

Aspects and advantages of the invention will be set forth in part in the following description, or may be obvious from the description, or may be learned through practice of the invention.

In one embodiment of the present subject matter, an extension tool having a proximal end and a distal end. The extension tool comprises a plurality of sequentially arranged links moveable relative to one another and a support member defining the distal end. The support member includes a first wheel disposed at the distal end and a second wheel spaced apart from the first wheel.

In another embodiment of the present subject matter, an extension tool for deployment within a component. The extension tool comprises a plurality of sequentially arranged links moveable relative to one another and a plurality of windows defined in the plurality of sequentially arranged links. The windows of the plurality of windows are defined periodically along the plurality of sequentially arranged links such that a periodicity of the widows corresponds to a periodicity of a plurality of features of the component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a side view of an extension tool according to an embodiment of the present subject matter in a slack or slackened position.

FIG. 2 provides a side view of the extension tool of FIG. 1 in a tensioned or rigidized position.

FIG. 3 provides a side view of a support member of the extension tool of FIG. 1, according to an embodiment of the present subject matter.

FIG. 4 provides a side, perspective view of an extension tool having a support member assembly defining a distal end of the extension tool, according to an embodiment of the present subject matter.

FIG. 5A provides a side, perspective view of a distal link of the extension tool of FIG. 4.

FIG. 5B provides a side, perspective view of a distal end of the support member assembly of FIG. 4.

FIG. 6 provides a schematic view of a gas turbine engine and extension tool in accordance with an embodiment of the present subject matter.

FIG. 7 provides a side view of one link of a plurality of sequentially arranged links of the extension tool of FIG. 1.

FIG. 8 provides a side, perspective view of a proximal end of one link of the plurality of sequentially arranged links of the extension tool of FIG. 1.

FIG. 9 provides a top, perspective view of a distal end of one link of the plurality of sequentially arranged links of the extension tool of FIG. 1.

FIG. 10 provides a side view of a transition link of the plurality of sequentially arranged links of the extension tool of FIG. 1, with internal line guide segments of the transition link shown in dashed lines.

FIG. 11 provides a flow diagram of a method of inserting an extension tool according to various embodiments of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 5, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter is directed to selectively flexible extension tools. More particularly, the present subject matter is directed to an extension tool having one or more features for facilitating insertion of the extension tool into a component and/or one or more features for facilitating communication between an internal passage of the extension tool and an environment external to the extension tool. In various embodiments, a selectively flexible extension tool comprises a plurality of sequentially arranged links moveable relative to one another and a support member defining a distal end of the extension tool. The support member includes a first wheel disposed at the distal end and a second wheel spaced apart from the first wheel. Additionally, or alternatively, the selectively flexible extension tool comprises a plurality of windows defined in the plurality of sequentially arranged links. The windows of the plurality of windows may be defined periodically along the plurality of sequentially arranged links such that a periodicity of the widows corresponds to a periodicity of a plurality of features of the component. Extension tools as described herein provide benefits such as positive control of the direction of insertion of the tool, without external strings or the like that could become snagged on a projection; reduced friction between the tool and the component into which the tool is inserted; and/or consistent, controllable positioning of instruments for lighting, imaging, etc. of one or more features of the component. One or more of these benefits can, e.g., reduce inspection time while improving inspection quality.

Referring now to the drawings, wherein identical numerals indicate the same elements throughout the figures, FIG. 1 is a schematic view of an extension tool 100 in accordance with an embodiment of the present disclosure in a slack or slackened position. FIG. 2 is a schematic view of the extension tool 100 of FIG. 1 in a tensioned or rigidized position. Accordingly, it will be appreciated from the description herein that the extension tool 100 is a selectively flexible extension tool. For at least certain embodiments, the extension tool 100 also may be referred to as a selectively rigidizable guide tube.

As described in greater detail herein, the extension tool 100 defines one or more passages therethrough. Such passages may receive a borescope or other device capable of transmitting images captured through an image device such as a camera or the like (which may be generally referred to herein as an "image device"). Alternatively, or additionally, one or more passages defined through the extension tool 100 may deliver wash fluid (e.g., a liquid or foam detergent or other cleaning agent), cooling fluid, or other fluid, and/or may provide a conduit for materials, tools, implements, or other devices for repair, maintenance, and/or cleaning to be delivered to one or more locations within a component into which the extension tool 100 is deployed. For example, the extension tool 100 may be deployed within a component, assembly, system, apparatus, etc. and a borescope may be inserted through the extension tool 100. A defect in a feature of the component may be detected via the borescope, which may be retracted such that a repair material and/or device(s) (e.g., a manipulation device for positioning the repair material and a heat source such as a laser, resistance welding device, brazing device, etc.) may be delivered through the extension tool 100 to the defect to repair the defect. As other examples, the extension tool 100 may be used to deliver coatings, patches, fluids, cleaning materials, tools, implements, etc. to one or more features of the component in which the extension tool 100 is deployed. The extension tool 100 is a steerable device capable of a multitude of applications, e.g., through the use of the various features described in greater detail below.

The extension tool 100 generally includes a base or handle 102, a line assembly 104, and a plurality of sequentially arranged links 106. The line assembly 104 generally includes a root 108 and a plurality of lines 110 extending from the root 108. In the depicted embodiment, the plurality of lines 110 includes a first line 110A and second line 110B that each extend through the plurality of links 106. As will be appreciated from the discussion herein, the line assembly 104, and in particular the first and second lines 110A, 110B, is operable with the plurality of sequentially arranged links 106 to move the plurality of sequentially arranged links 106 between the slack position (FIG. 1) and the tensioned or rigidized position (FIG. 2). Further, it will be appreciated that, for clarity, only a portion of the plurality of links 106 is shown in FIG. 1; some links 106, including a transition link 106T, are omitted to more clearly illustrate a proximal end 112 and a distal end 114 of the extension tool 100.

The plurality of sequentially arranged links 106 are under no pressure or marginal pressure when in the slack position (FIG. 1) to allow the plurality of sequentially arranged links 106 to pivotably move relative to one another, e.g., through a hinged connection between adjacent links 106. For instance, in the slack position, the plurality of links 106 may be spaced from one another or under no specific pressure to hold the links 106 in a particular position. By contrast, the plurality of sequentially arranged links 106 are pressed against one another when in the tensioned position (FIG. 2) to rigidly fix the plurality of sequentially arranged links 106 to one another. As shown in FIGS. 1 and 2, a hinge element 126, such as a pin or the like, forms the hinged connection or joint 128 between two adjacent links 106.

For the embodiment of FIGS. 1 and 2, it will be appreciated that each of the plurality of links 106 are designed to result in a specific rigidized shape when the plurality of links 106 are moved to the tensioned position. For example, a first link 106A of the plurality of links 106 defines a first geometry (i.e., length, curvature, etc.) and a second link 106B of the plurality of links 106 defines a second geometry (i.e., length, curvature, etc.). The first geometry is different than the second geometry. In at least certain embodiments, to form the plurality of links 106 having specific geometries to facilitate a desired shape of the plurality of links 106, each of the plurality of links 106 may be formed through an additive manufacturing process (sometimes also referred to as 3D printing). Such may facilitate the formation of specifically shaped links 106 to be fitted within the plurality of links 106 of an extension tool 100 resulting in a desired shape when moved to the tensioned position, yet still remaining flexible enough to fit through an anticipated environment.

Further, in at least certain embodiments, the plurality of links 106 may be formed from one or more materials to, e.g., optimize the material properties of each link 106 based on the function of the respective link 106 in the extension tool 100. For instance, the links 106 closer to the base 102, such as the links from a base link 124 to the transition link 106T, may be formed from a stiffer material than the links 106 distal of the transition link 106T because the proximal links 106, e.g., may be more curved or have a smaller radius of curvature, may experience greater stresses as the extension tool 100 is inserted and/or tensioned, etc. In some embodiments, the proximal links 106 may be formed from a first material such as a steel or the like, while the links 106 distal of the transition link 106T are formed from a second material that is a lighter and/or less stiff material, such as a plastic or the like. Other suitable materials also may be used, and it will be appreciated that, in at least some embodiments, the plurality of links 106 may be formed from the same material rather than different materials.

Moreover, with regard to the plurality of lines 110 of the line assembly 104, it will be appreciated that each of these lines 110 may be configured as cables, ropes, threads, etc. Accordingly, it will be appreciated that the lines 110 are generally flexible (i.e., will not significantly prevent the plurality of sequentially arranged links 106 from pivotably moving relative to one another in the slack position). Moreover, one or more of the lines 110 may be formed of a metal material, such as a steel, tungsten, etc. Alternatively, however, the lines 110 may be formed of any other suitable material.

In at least certain embodiments, it will be appreciated that the extension tool 100 depicted in FIGS. 1 and 2 may include a tool implement coupled to one of the plurality of links 106. For example, the tool implement may be coupled to the link 106 at the distal end 114 of the extension tool 100. In certain embodiments, the tool implement may include one or more sensors, cameras, or both, and additionally, or alternatively, may include one or more drills, laser tools, welding implements, rotatable implements (such as a Phillips head screwdriver bit, a flat head screwdriver bit, a Torx bit, Allen bit, Pozidrive, or the like), etc. In such a manner, the extension tool 100 may facilitate performing mechanical operations on a part at a remote location, or along an obscure vector within an environment (e.g., along a nonlinear path within the environment) that would otherwise be more difficult.

It will further be appreciated, however, that in other embodiments, the extension tool 100 may be configured in any other manner to perform operations at a remote location, or along an obscure vector, within an environment.

For instance, with one or more of the configurations, the extension tool 100 may include a flexible driveshaft, implement, device, or the like extending through an interior of the plurality of links 106, and more specifically, through a tube defined along a length of the plurality of links 106. Specifically, for the embodiment shown, the extension tool 100 is configured such that the plurality of sequentially arranged links 106 defines one or more passages therethrough when the plurality of sequentially arranged links 106 are in the tensioned position (FIG. 2). In various embodiments, the passage(s) may be a fluid flow passage, may be configured to, e.g., act as a guide tube for a tool, implement, or other device, or may be a combination of different types of passages, such as a fluid flow passage surrounding a guide tube.

It will be appreciated, that as used herein, the term "fluid flow passage" refers to any substantially continuous passage through the plurality of sequentially arranged links 106 when the plurality of sequentially arranged links 106 are in the tensioned position, capable of providing a gas or liquid flow to a location proximate the distal end 114 of the plurality of sequentially arranged links 106, or extracting a gas or liquid flow from a location proximate the distal end 114 of the plurality of sequentially arranged links 106.

In the embodiment depicted in FIG. 2, the plurality of sequentially arranged links 106 together define a passage 116, which, for the embodiment shown, is a guide tube 116. As such, with or without a tool implement as described above, the plurality of links 106 define an opening for receipt of one or more flexible driveshafts, implements, and/or devices, such as a borescope, a maintenance or repair tool, a cleaning implement, or other device. It will be appreciated that, to form the passage or guide tube 116, each link 106 of the plurality of links 106 defines an opening 118 therethrough, e.g., as best illustrated in FIG. 9. The opening 118 of each link 106 may be defined along a length thereof, extending from a link proximal end 120 to a link distal end 122. The openings 118 of adjacent links 106 in the plurality of sequentially arranged links 106 align in the tensioned position to define the passage or guide tube 116 for the one or more flexible driveshafts, implements, and/or devices to pass or travel therethrough.

Further, although depicted with only one passage 116, in other embodiments the extension tool 100 may include two or more passages. For example, the extension tool may include a second passage that is separate from the passage 116 when the plurality of sequentially arranged links 106 are in the tensioned position. Thus, the passage 116 is a first or an inner passage and the second passage is an outer passage, e.g., an outer fluid flow passage for flowing a fluid along an outer surface of the passage or guide tube 116. In such a manner, the inner passage is positioned inward of the outer passage, with the outer passage substantially completely surrounding the inner fluid flow passage. As such, the outer passage may define a generally annular shape surrounding the inner fluid flow passage. However, in other embodiments, the two or more passages may be arranged in any other suitable manner. For example, first and second passages may instead run parallel and adjacent to one another but may not be arranged concentrically (e.g., one of the first or second passages extending along one side of the plurality of links 106 and the other of the first or second passages extending along another side of the plurality of links 106).

Referring again to both FIGS. 1 and 2, it will be appreciated that the line assembly 104 is operable with the plurality of sequentially arranged links 106 to move the plurality of sequentially arranged links 106 between the slack position (FIG. 1) and tensioned position (FIG. 2). Specifically, the first line 110A and second line 110B of the line assembly 104 may loop around the plurality of links 106 through the link 106 at the distal end 114 of the plurality of links 106. When the first line 110A and second line 110B of the line assembly 104 are tensioned by applying a tensioning force to the lines 110A, 110B (such that an amount of slack is taken out of the first and second lines 110A, 110B), the tensioning force in the first line 110A and second line 110B presses each of the plurality of sequentially arranged links 106 against one another, fixing the plurality of sequentially arranged links 106 in position to form a substantially rigid extension. Notably, for the embodiment shown, the plurality of links 106 includes a base link 124 fixed to the base 102, allowing the first and second lines 110A, 110B to be pulled tight.

Referring now to FIGS. 3 through 5B, in various embodiments, the extension tool 100 also includes a support member 130 defining the distal end 114. The support member 130 includes two or more wheels 132 for controlling a direction of insertion of the extension tool 100. More particularly, for the depicted embodiments, the support member 130 includes a first wheel 132A disposed at the distal end 114 and a second wheel 132B spaced apart from the first wheel 132A. Each wheel 132 is freely rotatable about a respective transversely extending axle 131 (such as first and second axles 131A, 131B illustrated in FIG. 3). The first wheel 132A at the distal end 114 helps guide the tip of the extension tool 100 with reduced friction, e.g., compared to a tool 100 without a wheel at its distal end. The second wheel 132B helps avoid dragging the support member 130 where the support member 130 begins to transition to an offset position with respect to the link 106 adjacent the support member 130. For instance, for a support member 130 having a biased tip or distal end 114 (as shown, e.g., in FIGS. 2 through 6), without the second wheel 132B, the support member 130 would have to overcome significant friction between the extension tool 100 at the location where the second wheel 132B is disposed and the component as the extension tool 100 is inserted into the component. More specifically, without the second wheel 132B, the extension tool 100 would drag along the component, and it could be difficult for an operator or automated machine (such as a robot) to push against and overcome the friction between the extension tool 100 and the component. Therefore, similar to the first wheel 132A, the second wheel 132B helps insert the extension tool 100 with reduced friction.

In the embodiment shown in FIG. 3, the support member 130 is a distal link 106D of the plurality of sequentially arranged links 106 such that the distal link 106D defines the distal end 114 and includes the first wheel 132A and the second wheel 132B. More particularly, each of the first wheel 132A and the second wheel 132B is attached to the distal link 106D. In some embodiments, the first and second wheels 132A, 132B may be formed separately from the distal link 106D and then attached to the support member 130/distal link 106D. In other embodiments, each of the first and second wheels 132A, 132B may be integrally formed with the distal link 106D. For example, the first and second wheels 132A, 132B may be formed with the distal link 106D by an additive manufacturing process, e.g., a 3D printing process such that the wheels 132A, 132B may be described as "printed in place."

Referring particularly to FIGS. 4 and 5B, in other embodiments, the support member 130 is removably coupled to the plurality of sequentially arranged links 106 such that the first wheel 132A and the second wheel 132B are removable from the extension tool 100. More particularly, in the embodiment depicted in FIG. 4, the support member 130 comprises a first flexible member 134A for extending through the plurality of links 106 and a second flexible member 134B disposed between the first wheel 132A and the second wheel 132B. Further, in the embodiment of FIG. 4, the support member 130 comprises five wheels 132—the first wheel 132A and the second wheel 132B, as well as a third wheel 132C, a fourth wheel 132D, and a fifth wheel 132E disposed between the first wheel 132A at the distal end 114 and the second wheel 132B. That is, of the five wheels 132, the second wheel 132B is disposed closest to the proximal end 112 of the extension tool 100 such that the third, fourth, and fifth wheels 132C, 132D, 132E are positioned between the distal first wheel 132A and the proximal second wheel 132B. A flexible member 134 is positioned between each pair of adjacent wheels 132. More specifically, the second flexible member 134B is disposed between the second wheel 132B and the third wheel 132C, a third flexible member 134C is disposed between the third wheel 132C and the fourth wheel 132D, a fourth flexible member 134D is disposed between the fourth wheel 132D and the fifth wheel 132E, and a fifth flexible member 134E is disposed between the fifth wheel 132E and the first wheel 132A. The support member 130, wheels 132, and flexible members 134 form a support member assembly 136 for insertion through the plurality of links 106 such that the support member 130 can protrude from the distalmost link 106 to guide the extension tool 100 into position within a component, device, system, etc.

The flexible members 134 can be any flexible member with a sufficient stiffness to facilitate steering the support member 130 through the plurality of links 106 and a sufficient flexibility to promote extraction of the support member 130 from the plurality of links 106, e.g., once the extension tool 100 is in position within a component such as a gas turbine combustor or turbine stage, a pressure vessel, etc. In some embodiments, each flexible member 134 is a spring, e.g., for the embodiment shown in FIGS. 4 and 5B, each of the first flexible member 134A, second flexible member 134B, third flexible member 134C, fourth flexible member 134D, and fifth flexible member 134E is a spring. Other suitable flexible members may be used as well, and in some embodiments, a combination of two or more different types of flexible members may be used to form the support member assembly 136.

Further, in the depicted embodiment, the first flexible member 134A, which extends from the proximal end 112 to the support member 130, has a length that is significantly longer than a length of the other flexible members 134. That is, the first flexible member 134A is longer than each of the second flexible member 134B, third flexible member 134C, fourth flexible member 134D, and fifth flexible member 134E. In some embodiments, each of the second flexible member 134B, third flexible member 134C, fourth flexible member 134D, and fifth flexible member 134E may have the same length or be of equal length, but in other embodiments, one or more of the second flexible member 134B, third flexible member 134C, fourth flexible member 134D, and fifth flexible member 134E may have a different length. Moreover, although previously described as having one first flexible member 134A that extends from the proximal end 112 of the tool 100 to the support member 130, it will be appreciated that, in appropriated embodiments, the first flexible member 134A may be segmented into or comprise multiple flexible members. That is, the support member assembly 136 need not include only a single flexible member 134 that extends from the proximal end 112 of the tool 100 to the support member 130 but, in some embodiments, may include multiple flexible members extending from the proximal end 112 to the support member 130.

As shown in FIGS. 4 and 5A, the distal link 106D of the plurality of sequentially arranged links 106 defines an opening 138 for receipt of the support member 130. More particularly, the opening 138 allows the wheels 132 of the support member 130 to extend distal to the plurality of links 106. That is, the wheels 132 extend distally with respect to the plurality of links 106, and a location feature 140 at the proximal end 142 of the support member 130 is received in the opening 138. More specifically, the opening 138 has a perimeter P, and the location feature 140 at the support member proximal end 142 cooperates with the perimeter P to position the wheels 132 in a pre-determined orientation.

Referring particularly to FIGS. 5A and 5B, the location feature 140 further comprises an endstop 144 for restricting travel of the support member 130 through the plurality of links 106 when the first wheel 132A and the second wheel 132B (with, for the embodiment shown, the third, fourth, and fifth wheels 132C, 132D, 132e disposed therebetween) are disposed distal to the plurality of links 106. The endstop 144 cooperates with a projection 146 on the distal link 106 that extends into the opening 138 to stop the support member assembly 136 from continuing to travel from the distal link 106D once the wheels 132 have exited the distal link 106D such that the first wheel 132A defines the distal end 114 of the extension tool 100. More particularly, the endstop 144 of the support member 130 defines a groove for receipt of the projection 146 of the distal link 106D such that when the projection 146 contacts a proximal wall 148 of the endstop 144, the support member 130 is prevented from traveling any further distally through the links 106. As such, the location feature 140, comprising the endstop 144, are positioned on the support member 130 such that a desired length of the support member 130, which comprises the wheels 132, extends distally from the distal link 106D of the plurality of links 106. Further, it will be appreciated that the endstop 144 limits only distal travel of the support member assembly 136 and, thus, does not interfere with retraction of the support member assembly 136 through the links 106, i.e., the endstop 144 does not interfere with proximal travel (toward the proximal end 112) of the support member assembly 136. Moreover, as shown in FIG. 5B, a sixth flexible member 134F is disposed between the endstop 144 and the second wheel 132B, e.g., to facilitate flexibility in the support member 130 to move through the links 106 as described above.

As shown in FIGS. 1 through 5B, the support member 130 extends along a support member longitudinal centerline $CL_{SM}$ such that the distal end 114, which is defined by the support member 130 and is the distal end of the support member 130, is biased away from the support member longitudinal centerline $CL_{SM}$. Further, as shown most clearly in FIG. 2 for the illustrated embodiment, the support member 130 is biased in a direction opposite to the majority of the links 106, which are slightly biased with respect to a link longitudinal centerline $CL_L$ such that, together, the majority of the links 106 form an arc shape for traversing an annular or circular component, assembly, system, etc. In other embodiments, the plurality of links 106 may define other shapes upon tensioning, depending on the shape of the component, assembly, system, etc. into which the extension tool 100 is inserted. It will be appreciated that the support member 130, whether formed as the distal link 106D of the plurality of links 106 or as part of a removable support member assembly 136, is biased in a direction to facilitate insertion of the extension tool 100 into the device or apparatus undergoing inspection, maintenance, cleaning, etc. The biased distal end 114 of the extension tool 100, along with the wheels 132 positioned at and near the distal end 114, helps control the insertion direction of the extension tool 100. Such positive control of the insertion direction—through the offset wheeled tip provided by the biased support member 130—may be particularly beneficial for insertion in annuli and, more particularly, "upward" insertion, or insertion against gravity, in annuli.

Further, it will be appreciated that the flexible support member 130 of the support member assembly 136 shown in FIGS. 4, 5A, and 5B assumes the biased configuration upon exiting the distal link 106D and defining the distal end 114. More particularly, to move through the plurality of links 106, the flexible members 134 flex to permit the support member assembly 136 to follow the path defined by an internal passage 116 through the links 106. That is, the flexible members 134 allow the support member assembly 136 to conform to the shape of the internal passage 116 defined by plurality of links 106 such that the support member assembly 136 can travel through the links 106. However, when the support member 130 of the support member assembly 136 emerges from the opening 138 in the distal link 106D, the support member 130 assumes a biased configuration as shown in FIGS. 4 and 5B that, with the wheels 132, helps control the insertion direction of the extension tool 100 as described above.

As shown in FIGS. 2 through 5A and FIGS. 6 through 8, in embodiments, the plurality of sequentially arranged links 106 defines a plurality of windows 150. The windows 150 define openings in the links 106 for communication between the internal passage 116 defined by the links 106 and the environment external to the extension tool 100. The windows 150 of the plurality of windows 150 are defined periodically along the plurality of links 106 such that a periodicity of the windows 150 corresponds to a periodicity of a plurality of features of the component, assembly, system, device, apparatus, etc. in which the extension tool 100 is deployed. That is, the location of each window 150 corresponds to a periodic feature of the component, etc. in which the extension tool 100 is deployed for inspection, maintenance, cleaning, etc.

For example, referring to FIG. 6, one application of the various extension tools 100 of the present disclosure will be described. Specifically, FIG. 6 depicts an extension tool 100 in accordance with an embodiment of the present subject matter being utilized to navigate through a nonlinear path within an environment, which for the embodiment shown is a gas turbine engine 10. Specifically, for the embodiment of FIG. 6, the gas turbine engine 10 is configured as a turbofan engine. The turbofan engine generally includes a fan section 14 and a turbomachine 16.

The turbomachine 16 generally includes a compressor section having a low pressure ("LP") compressor 22 and a high pressure ("HP") compressor 24; a combustion section 26; a turbine section including an HP turbine 28 and an LP turbine 30; and an exhaust section (not shown). The compressor section, combustion section 26, turbine section, and exhaust section are each arranged in serial flow order. The LP compressor 22 and LP turbine 30 are coupled through an LP shaft 36, and similarly, the HP compressor 24 and HP turbine 28 are coupled to an HP shaft 34. Additionally, the turbomachine 16 includes a casing 18 enclosing at least in part the above-noted components of the turbomachine 16. Further, for the embodiment shown, the fan section 14 includes a fan 38 having a plurality of fan blades 40, with the fan 38 and plurality of fan blades 40 being driven by the LP shaft 36.

In the callout circle, a close-up, schematic view of a portion of the combustion section 26 of the gas turbine engine 10 is provided. The combustion section 26 generally includes an inner liner 42 and an outer liner 44, together defining at least in part a combustion chamber or combustor 46. The combustion section 26 further includes a plurality of deflectors 48, which are disposed in a periodic arrangement about a longitudinal centerline axis 12 of the gas turbine engine 10. More particularly, the deflectors 48 may be disposed at a forward end of the combustor 46, between the annular inner liner 42 and the annular outer liner 44. Each deflector 48 has an opening 50 into which a fuel nozzle 52 is disposed when the engine 10 is assembled. It will be appreciated that the deflectors 48 and the fuel nozzles 52 are disposed in a regular, periodic arrangement about the annular forward end of the combustor 26.

After operating for an amount of time, an undesirable amount of coke buildup may form on or within the fuel nozzles 52. For example, during a shutdown of the gas turbine engine 10, fuel may remain within a fuel nozzle 52 and residual heat within the gas turbine engine 10 may cause the remaining fuel to coke. During, e.g., a maintenance interval, the extension tool 100 may be utilized to remove the buildup of coke on or within the fuel nozzles 52. Further, the extension tool 100 may be utilized for inspection of the deflectors 48, repair of any damage to the deflectors 48, and/or cleaning of the deflectors 48.

The extension tool 100 depicted in FIG. 6 may be configured in accordance with one or more of the embodiments described herein. For example, the extension tool may generally include a plurality of links 106 movable to a tensioned position (shown) having a nonlinear, two-dimensional or three-dimensional shape when in the tensioned position. Notably, the ability to additionally be moved to a slack position may assist with moving the plurality of links 106 through the gas turbine engine 10 environment and through, e.g., a port in the combustor 46 through which the extension tool 100 is inserted.

Further, the extension tool 100 may define windows 150 in the plurality of links 106 such that the windows 150 have a periodic arrangement like the deflectors 48 and fuel nozzles 52. In the depicted embodiment, the periodicity of the windows 150 matches or is the same as the periodicity of the fuel nozzles 52 (and/or the deflectors 48 and/or the openings 50) such that, e.g., a borescope or other instrument traveling through the plurality of links 106 can inspect, perform maintenance on, clean, or otherwise service each periodic feature (e.g., the deflectors 48 and/or the fuel nozzles 52 received therein). That is, one window 150 of the plurality of windows 150 aligns with a respective one feature of the plurality of features (e.g., a respective deflector 48 and/or a respective fuel nozzle 52) to facilitate inspection, maintenance, cleaning, servicing, etc. of each feature.

The corresponding periodicity between the windows 150 and the features helps ensure each feature is inspected or otherwise serviced. To further ensure that no feature is overlooked, or to help provide specialized service to one or more particular features, each window 150 defined in the extension tool 100 may be labeled and indexed to a respective feature of the plurality of features. For instance, as illustrated in FIGS. 7 and 8, each window 150 may be labeled sequentially with a letter (e.g., A, B, C, D, etc.). Each label A, B, C, D, etc. may be matched to a respective feature, such as a respective fuel nozzle 52 as shown in FIG. 6, and the matches between corresponding windows 150 and features may be stored, e.g., in a lookup table or the like for use during inspection, maintenance, cleaning, etc. of the component including the features. As one example, one fuel nozzle 52 of the plurality of fuel nozzles 52 shown in FIG. 6 may have previously been repaired, and using the window 150 that corresponds with or is known to align with the repaired fuel nozzle 52, a borescope or the like may be deployed through the extension tool 100 to inspect the repair through the corresponding window 150. Further, as previously described, the extension tool 100 may be developed for the specific component including the features (e.g., the combustor 26) such that it may be readily determined, e.g., through the periodicity of the features and the corresponding periodicity of the windows 150, which window 150 aligns with which feature when the extension tool 100 is inserted into the component at a given location in a given direction.

It will be appreciated that, in various embodiments, the plurality of features may be a plurality of turbine nozzle airfoils of the engine 10, a plurality of compressor blades of the engine 10, a weld line of a pressure vessel, an internal structural member of an oil tank, etc. The extension tool 100 may be used with a specific component, device, apparatus, etc., such that the periodicity of the windows 150 is tailored to the periodicity of the relevant feature. Further, the periodicity of the windows 150 need not necessarily correspond to the plurality of links 106, i.e., a window 150 may not be defined in each link 106, the windows 150 may not be defined in the same location along each link 106, etc. Additionally, the length of each link 106 may be defined to optimize navigation of the extension tool through the component while the extension tool 100 is in the slack position (FIG. 1), while the periodicity of the windows 150 is determined by alignment with the periodic feature in the component. As such, there need be no specific relationship between the length of the links 106 and the periodicity of the windows 150, except that, depending on the form or configuration of the ends 120, 122 of the links 106, a window 150 likely should not span the joint 128 between two links 106.

Moreover, although the links 106 depicted in FIGS. 2, 3, 7, and 8 comprise a pair of windows 150 that are defined opposite one another along a transverse direction of the link 106, the windows 150 need not be defined in pairs. More specifically, a link 106 may define only one window 150 without a second window 150 defined transversely opposite the one window. Further, the windows 150 may be defined at different positions along the perimeter or circumference of one or more links 106. For instance, for a plurality of links 106 having a generally circular cross-sectional shape as shown in the figures, a first link 106 may define a first window 150 at a first circumferential location along the first link 106, and a second link 106 may define a second window at a second circumferential location along the second link 106, where the second circumferential location is different than the first circumferential location. In other embodiments, the first link 106 may define both the first and second windows 150, with the first and second windows defined at differential circumferential locations with respect to the first link 106. In this way, the location of the windows 150 may be further tailored to the location of corresponding features or elements of the component in which the extension tool 100 is deployed, e.g., for inspection, maintenance, cleaning, etc. of the various features or elements.

In some embodiments, one or more windows 150 of the plurality of windows 150 is defined by diverging walls 152, e.g., each window 150 may be defined by diverging walls 152. More particularly, each window 150 is defined by one or more walls 152, which define the shape of the window 150. As shown in FIGS. 4 and 5A, the walls 152 defining the windows 150 may diverge from an inner surface 154 to an outer surface 156 of a wall 178 of the links 106 such that the windows 150 are defined by diverging walls 152. The diverging walls 152 may limit interference from the walls 152 with the field of view of a camera or other image device (e.g., a borescope) looking through the windows 150 with diverging walls 152, i.e., the diverging walls may accommodate the field of view of an image device such as a borescope. Additionally, or alternatively, the diverging walls 152 may help direct a fluid from an internal passage (such as passage 116) through the links 106 to the feature of the component in which the extension tool 100 is inserted, e.g., the diverging walls 152 may match the divergence angle of a spray process for spraying a fluid such as a cleaning or wash solution. Other benefits also may be realized from diverging walls 152, and other configurations of the walls 152 may be used as well, e.g., in some embodiments in may be appropriate to utilize converging rather than diverging walls 152 or the walls 152 may be generally "straight" or planar, without any diverging or converging configuration, e.g., as shown in FIGS. 3, 7, and 8.

Referring now to FIGS. 7 through 10, the links 106 of the plurality of sequentially arranged links 106 has a specific shape at each of the link proximal end 120 and the link distal end 122. For example, as shown in the embodiment of FIGS. 7, 9, and 10, the link distal end 122 of each link 106 of the plurality of links 106 has an elongated hooked nose 158, and the link proximal end 120 of each link 106 of the plurality of links 106 has a shape 160 complementary to the elongated hooked nose 158. More particularly, the link proximal end 120 may define a shape 160 that is a recess for receipt of an adjacent link distal end 122, with the recess shaped complementary to the shape of the elongated hooked nose 158 of the link distal end 122.

It will be appreciated that the link distal end 122 defines a male alignment feature that mates with or is received by a female alignment feature of an adjacent link proximal end 120. Thus, the elongated hooked nose 158 and the complementary shape or recess 160 cooperate to align adjacent links 106 with one another as the extension tool 100 is tensioned into the tensioned configuration shown in FIG. 2. Further, the elongated hooked nose 158 can help guide each link 106 into and/or through an opening or aperture into which the extension tool 100 is inserted. More specifically, the elongated hooked shape of the distal nose 158 of each link 106 may "capture" a wall defining the opening or aperture into which the extension tool 100 is inserted to help guide each link 106 into the opening or aperture. Such "capture" may be particularly beneficial when a movable ferrule or the like defines a portion of the opening or aperture; the elongated hooked nose 158 captures or stabilizes the ferrule with respect to the link 106 to direct the link distal end 122 into the opening or aperture and thereby guide the remainder of the link 106 into the opening or aperture.

Turning particularly to FIG. 8, in at least certain embodiments, each link 106 of the plurality of sequentially arranged links 106 defines a sight line 162, e.g., to guide a borescope or other image device through the internal passage 116 defined by the links 106. As illustrated in FIG. 8, the sight line 162 extends between each window 150 of the plurality of windows 150 arranged along a path 164. The path 164 may be defined to position each window 150 at a respective feature of the plurality of features as previously described. That is, as described above, the windows 150 of the plurality of windows 150 may be defined at various positions along the extension tool 100 to correspond with, e.g., periodic features of the component into which the extension tool 100 is deployed. The various positions of the windows 150 define the path 164 such that the path 164 extends through the windows 150 from at or near the proximal end 112 to the distalmost window 150.

It will be appreciated that, for an extension tool 100 having pairs of windows 150 defined across from or aligned with one another (thereby defining an opening through the respective link 106 along the transverse direction T), a path 164 may be defined through each respective window 150 of the pair of windows 150, e.g., as shown in FIG. 8, a first path 164A through a first window 150A of the pair of windows 150 and a second path 164B through a second windows 150B of the pair of windows 150. A sight line 162 is defined along each path 164; for instance, as shown in FIG. 8, a first sight line 162A is defined along each path 164A and a second sight line 162B is defined along the second path 164B.

The sight line(s) 162 guide an image device, such as a borescope, through the passage 116 defined by the links 106, e.g., by providing a feature within the passage 116 the image device can track through the passage 116. As such, the sight line(s) 162 may help keep the image device oriented within the passage 116, and the image device may follow a respective sight line 162 to advance to each successive window 150 along the respective path 164. As further illustrated in FIG. 8, each window 150 may be labeled adjacent the sight line 162 such that the image device may be used to confirm the position of the image device within the extension tool 100 and/or the component, system, device, apparatus, etc. in which the extension tool 100 is deployed. As previously described, the window labels (e.g., letters such as the letter "A" shown in FIG. 8) may be indexed to specific features such that when the extension tool 100 is deployed within the component, etc., the window 150 with a specific label corresponds to a specific feature of a plurality of features of the component. Further, for extension tools 100 comprising a pair of windows 150 that are defined opposite one another along the transverse direction T, the labels adjacent each window in the pair of windows 150 may be assigned separate labels to distinguish the direction of insertion. For example, one window 150 of the pair of windows 150 may be labeled with the letter "A" and the opposite window 150 of the pair of windows 150 may be labeled with the letter "Z" such that a user of the extension tool 100 can determine whether the direction of insertion (of the tool 100, borescope, etc.) is clockwise or counterclockwise depending on which window 150 (i.e., the "A" window 150 or the "Z" window 150) provides a view of the component feature.

Referring now to FIGS. 2 and 10, in at least certain embodiments, the plurality of sequentially arranged links 106 includes a transition link 106T in which the position of the lines 110 switches as the extension tool 100 defines a first radius of curvature $R_1$ between the proximal end 112 and the transition link 106T and a second radius of curvature $R_2$ between the transition link 106T and the support member 130. More particularly, the first line 110A is a continuous line 110, having a first portion 166A extending through the plurality of links 106 and a second portion 166B extending through the plurality of links 106, and the first and second portions 166A, 166B are integral at the distal link 106D. Likewise, the second line 110B is a continuous line 110, having a first portion 168A extending through the plurality of links 106 and a second portion 168B extending through the plurality of links 106, and the first and second portions 168A, 168B are integral at the distal link 106D. For example, referring now briefly to FIG. 3, a side view of a distal link 106D is provided, which illustrates a first opening 165A through the distal link 106D for the first line 110A to loop around and, thus, define a proximally extending portion (i.e., one of the first portion 166A and second portion 166B) on one side of the plurality of links 106 and a distally extending portion (i.e., the other of the first portion 166A and second portion 166B) on the opposite side of the plurality of links 106, with the two portions joined at the distal link 106D. Similarly, FIG. 3 illustrates a second opening 165B through the distal link 106D for the second line 110B to loop around and, thus, define a proximally extending portion (i.e., one of the first portion 168A and second portion 168B) on one side of the plurality of links 106 and a distally extending portion (i.e., the other of the first portion 168A and second portion 168B) on the opposite side of the plurality of links 106, with the two portions joined at the distal link 106D. Thus, each of the first line 110A and the second line 110B loops around at the distal link 106, which may allow the lines 110A, 110B to provide the tensioning force to move the links 106 to the tensioned position (FIG. 2).

Further, as shown in FIG. 2, the extension tool 100 in the tensioned position curves in two different directions. Generally, when in the tensioned position, the extension tool 100 comprises at least two arcs or curves that arc or curve in different directions, and the at least two arcs or curves may have the same or different radii of curvature. More specifically, in the depicted embodiment, the extension tool 100 curves to the right when proceeding distally along the plurality of links 106 from the base 102 to the transition link 106T, and the extension tool 100 curves to the left when proceeding distally along the plurality of links 106 from the transition link 106T to the support member 130. As previously described the first, righthand curve has a first radius of curvature $R_1$, and the second, lefthand curve has a second, different radius of curvature $R_2$. More generally than right or left, a centrality or center $C_1$ of the first radius of curvature $R_1$ is on a different side of the plurality of links 106 than a centrality or center $C_2$ of the second radius of curvature $R_2$. Further, in at least some embodiments, such as shown in FIG. 2, the first radius of curvature $R_1$ is smaller than the second radius of curvature $R_2$.

Referring back to FIG. 10, which illustrates the transition link 106T with a line guide 170 for each line 110 highlighted to show how the lines 110 cross over in the transition link 106T. More particularly, as shown most clearly in FIGS. 8 and 9, the plurality of sequentially arranged links 106 includes a first line guide 170 for the first line 110A and a second line guide 172 for the second line 110B. Each link 106 includes a segment 174 of the first line guide 170 and a segment 176 of the second line guide 172, i.e., each link 106 defines a segment 174, 176 of the respective line guide 170, 172 such that together, the links 106 define the first line guide 170 and the second line guide 172. For the embodiment shown, the line guide segments 174, 176 are defined by a wall 178 of each link 106 of the plurality of links 106. As such, the line guides 170, 172 are defined within the walls 178 of the links 106 between an outer surface 156 of the links 106 and the internal passage 116.

Referring to FIGS. 2 and 10, in the depicted embodiment, the links 106 have an inner side 182 and an outer side 184 with respect to each of the two arcs or curves in the tensioned extension tool 100. That is, each link 106 defining the respective curve has an inner side 182 that is closer to the center C of the respective curve than an outer side 184, where the inner side 182 and the outer side 184 are opposite one another along the transverse direction T. For each curve, the first line 110A is disposed on the outer side 184 of the links 106, and the second line 110B is disposed on the inner side 182 of the links 106. Because the inner side 182 and the outer side 184 is not the same for every link but is reversed for the links 106 on the proximal side of the transition link 106T compared to the links 106 on the distal side of the transition link 106T, the lines 110A, 110B must switch sides to remain on the inner side 182 for all the links 106 (in the case of the second line 110B) or the outer side 184 for all the links 106 (in the case of the first line 110A). For the depicted embodiment, switching sides is advantageous because one line 110 may be held at a separate tension from the tension in the other line 110 to hold all the hinge elements 126 at the joints 128 between adjacent links 106 in contact with one another during the insertion of the extension tool 100 into the component and/or removal of the extension tool 100 from the component.

As illustrated in FIG. 10, the lines 110A, 110B cross over in the transition link 106T, which is the location of transition between the two arcs or curves. Thus, for each of the first portion 166A and the second portion 166B of the first line 110A, the first line guide segment 174 of the transition link 106T is defined at the link proximal end 120 in an upper portion 186 of the wall 178 of the transition link 106T and is defined at the link distal end 122 in a lower portion 188 of the wall 178. The first line guide segment 174 transitions from the upper portion 186 to the lower portion 188 along a smooth curve. Similarly, for each of the first portion 168A and the second portion 168B of the second line 110B, the second line guide segment 176 of the transition link 106T is defined at the link proximal end 120 in the lower portion 188 of the wall 178 and is defined at the link distal end 122 in the upper portion 186 of the wall 178, with the second line guide segment 176 transitioning from the lower portion 188 to the upper portion 186 along a smooth curve. It will be understood that "upper" and "lower" are used only for convenience due to the position of the transition link 106T in FIG. 10, where the line guide segments 174, 176 appear to switch from above to below (or vice versa) one another. However, the terms "upper" and "lower" are intended to convey only that the wall portions are opposite one another and are not intended to limit the configuration of the line guide segments 174, 176 and/or the transition link 106T.

As shown in FIG. 10, the first and second line guide segments 174, 176 form a X shape as each line guide 170, 172 transitions from one portion of the wall 178 to the opposite portion of the wall 178. It will be appreciated that the line guides 170, 172 (more particularly, the line guide segments 174, 176) do not contact one another such that the lines 110A, 110B do not contact one another. Instead, each line 110A remains within its respective line guide 170, 172 to facilitate tensioning and relaxing of the extension tool 100.

In other embodiments, the first and second lines 110A, 110B may transition from one side to another of the extension tool 100 in other ways as well. For example, a crossover transition within the transition link 106T is depicted in FIG. 10. A crossover transition as shown imparts essentially zero torque on the links 106, which may be beneficial for at least certain link materials, such as plastics that experience material creep. Also, a crossover transition may be more stable than other transition schemes. However, other transition designs, such as a 180° twist design, may be used as well. A 180° twist design may have each line twist 180° to transition from one side to an opposite side of the extension tool 100, which may be a simpler design that the crossover transition but may be less stable and lack the same benefits with respect to, e.g., material creep.

The extension tool 100 may include other features or elements as well. Referring back to FIG. 7, in at least certain embodiments, the plurality of sequentially arranged links 106 includes a light element 190 for illuminating an environment external to the plurality of links 106. For example, one or more links 106 may include one or more light elements 190, such as light emitting diodes (LEDs), light pipes, etc., for providing light within the component in which the extension tool 100 is inserted. The light element(s) 190 may be embedded into the outer surface 156 of one or more links 106. Alternatively, or additionally, one or more light elements 190 may be included within the links 106, e.g., to illuminate the internal passage 116 to assist an image device (such as a borescope or the like) navigate the passage 116. In such embodiments, with or without light element(s) embedded in the outer surface 156, the light element(s) 190 may be embedded into the inner surface 154 of the wall 178 of each link 106 such that the light is directed into the passage 116. The light elements 190 may be provided with electrical power using the lines 110 as conductors. For instance, each light element 190 or one or more groups of light elements 190 may be provided by power from the lines 110 via circuits connected to the lines 110 using pickups or brushes, enabling the lines 110 to continue to move slidably within their respective passages or guides 170, 172.

Further, in at least certain embodiments, the extension tool 100 also includes features for providing one or more fluid flows therethrough. For instance, the passage 116 may be, in whole or in part, a fluid flow passage for providing a fluid flow therethrough. In an embodiment, the passage 116 defined by the walls 178 of the plurality of links 106 is a cooling passage for receipt of a cooling fluid F (FIGS. 8, 9) within the plurality of sequentially arranged links 106. In some embodiments, the passage 116 may receive a flow of the cooling fluid in addition to receiving one or more implements, tools, or other devices. For instance, the cooling fluid F may flow through the passage 116 to cool the one or more implements, tools, or other devices and/or to cool the extension tool 100 and/or its surrounding environment. Such cooling may allow the extension tool 100 to be deployed within a component, system, device, or apparatus, e.g., without waiting for the component, etc. to cool to a threshold temperature. It will be appreciated that the cooling fluid F may exit through the plurality of windows 150, and in embodiments comprising diverging window walls 152, the windows 150 may define nozzles for delivering the flow of the cooling fluid F to the environment external to the extension tool 100.

As an example, the flow of the cooling fluid F through the passage 116 may allow the extension tool 100 to be deployed in a gas turbine engine, such as the engine 10 shown in FIG. 6, sooner after engine shutdown than an extension tool 100 without cooling. The flow of the cooling fluid F through the extension tool 100 may keep the extension tool 100 and/or the implements, tools, and/or other devices used therewith cool enough to use within the engine 10 even though the engine 10 has not cooled to a threshold temperature.

In other embodiments, the passage 116 may receive the flow of cooling fluid F without receiving one or more implements, tools, or other devices, i.e., the passage 116 may be a cooling passage only. In still other embodiments, the plurality of links 106 may define one or more passages in addition to the passage 116. The other passages may receive the flow of cooling fluid F in addition to the passage 116 receiving the cooling fluid F or instead of the passage 116 receiving the cooling fluid F. In yet other embodiments, the one or more passages defined by the plurality of links 106, including the passage 116, may receive one or more different fluid flows, e.g., a heated gas flow, a pressurized gas flow, a heated liquid flow, a pressurized liquid flow, a flow of cleaning foam or other cleaning material, etc. The different fluid flows may have different temperatures, pressures, and/or compositions. For instance, one passage may receive the flow of cooling fluid F, another passage may receive a flow of liquid detergent, etc. As another example, one passage may be configured for receipt of different fluid flows at different times during deployment of the extension tool 100 in a component, e.g., the passage may receive the flow of cooling fluid F, at another time may receive the flow of liquid detergent, and at yet another time may receive a heated gas flow. As described above, the windows 150 defined in the plurality of links 106 may act as nozzles for directing the fluid (e.g., a wash fluid or foam, a detergent, a gas, etc.) external to the extension tool 100, e.g., to a specific feature of the component or to the external environment generally.

It will further be appreciated from the discussion above that for the embodiments depicted and described, adjacent links 106 are sealed together by the mating geometries at their respective ends, which are complementary in shape with the mating geometries of the adjacent links. The walls 178 of the links 106 are pressed together and the contact pressure applied by the lines 110 may form a contact seal therebetween to provide a seal between such links 106.

In general, the embodiments of the extension tool 100 described herein may be manufactured or formed using any suitable process. However, in accordance with several aspects of the present subject matter, the extension tool 100 may be formed using an additive-manufacturing process, such as a 3D printing process. The use of such a process may allow, e.g., each link 106 and the support member 130 to be formed as a single monolithic component, or as any suitable number of sub-components. In particular, the manufacturing process may allow each link 106 and the support member 130 to be integrally formed and include a variety of features not possible when using prior manufacturing methods. For example, the additive manufacturing methods described herein enable the manufacture of links 106 having any suitable size and shape with one or more configurations of internal cavities, passageways, sight lines, and line guides, as well as windows, end geometries, and other features which were not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although additive manufacturing processes for forming the components described herein are described in detail, it should be appreciated that in alternate embodiments, all or a portion of these components may be formed via casting, machining, and/or any other suitable manufacturing process. Indeed, any suitable combination of materials and manufacturing methods may be used to form these components.

Notably, in embodiments, several features of the components described herein were previously not possible due to manufacturing restraints. However, the present inventors have advantageously utilized current advances in additive manufacturing techniques to develop embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous material, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers, unique mating or complementary geometries, tailored cooling cavity sizes and shapes, and/or tailored passageway numbers, shapes, and paths. As a specific example, using additive manufacturing methods such as those described herein, one or more links 106 of the plurality of links 106 may be formed with unique line guide passages and sight line paths defined therein. Further, each link 106 of the plurality of links 106 may have a unique geometry, including the various passageways, line guides, and/or line guide segments 116, 170, 172, 174, 176, sight lines 162, windows 150, and/or other features that may be defined therein, such that the extension tool 100 is tailored in size, shape, etc. to be used in a specific component, assembly, system, device, apparatus, etc. Moreover, additive manufacturing methods may allow manufacture of such a tailored extension tool 100, including, e.g., a plurality of unique links 106, with reduced manufacturing time, cost, and complexity compared to other manufacturing methods.

In addition, although additive manufacturing enables manufacture of single monolithic components as describe herein from a single material, the additive manufacturing process also enables the manufacture of a single component having different materials such that different portions of the component may exhibit different performance characteristics. The successive, additive nature of the manufacturing process enables the construction of these novel features. As a result, the components described herein may exhibit improved performance and reliability.

It should be appreciated that the extension tool 100, comprising a plurality of links 106 and a support member 130, described herein is only for the purpose of explaining aspects of the present subject matter. For example, the extension tool 100 is used herein to describe various configurations, constructions, and methods of manufacturing the extension tool 100. It should be appreciated that the additive manufacturing techniques discussed herein may be used to manufacture other extension tools, links, or similar components for use in any suitable device, for any suitable purpose, and in any suitable industry. Thus, the components and methods described herein are used only to illustrate aspects of the present subject matter and are not intended to limit the scope of the present disclosure in any manner.

The present subject matter also includes insertion methods, i.e., methods of inserting the extension tool 100 into a component or the like. The extension tool 100 may be configured according to any one of the various embodiments described herein. For example, as shown in FIG. 11, a method 200 includes (202) inserting the support member 130, which defines the distal end 114 of the extension tool 100, through a port or aperture in the component. The method 200 further includes (204) pushing the extension tool 100 to direct the plurality of links 106 through the port. As described herein, the distal end 122 of each link 106 may comprise an elongated hooked nose 158, which helps guide the link 106 through the port, e.g., by "capturing" the structure defining the aperture and then sliding into the aperture. As the links 106 move through the port, adjacent links 106 close up at their mating, complementary shaped ends 120, 122, e.g., to help prevent the links 106 from snagging on any projection or perpendicular surface of the component in the insertion path of the extension tool 100.

Moreover, as the extension tool 100 is pushed to direct the plurality of links 106 into the component, the support member 130 comprising the wheels 132 guides the links 106 through the component. The biased shape of the support member 130, along with the wheels 132, may be particularly helpful for facilitating insertion into a curved component, such as an annular gas turbine engine combustor, an annular gas turbine engine turbine or compressor stage, a spherical or cylindrical pressure vessel or tank, etc., or along a nonlinear insertion path. More particularly, the biased shape and the wheels 132 of the support member 130 help prevent the links 106 from being caught or arrested on a feature or surface of the component, e.g., compared to a relatively blunt distal end of the links 106.

The method 200 also includes (206) tensioning or rigidizing the extension tool 100 such that it assumes a predetermined shape, such as shown in FIG. 2. In some embodiments, the extension tool 100 may be tensioned or rigidized manually, e.g., a person may manipulate an element of the base 102 by hand to tighten the lines 110 and draw together the links 106 and support member 130. In other embodiments, the extension tool 100 may be tensioned or rigidized automatically; for example, the base 102 may be coupled to or integrated with an automated machine, e.g., a robot, such that the lines 110 are tightened using numerical control, computer control, etc.

Upon insertion of the extension tool 100 into the component, for an extension tool 100 including the plurality of windows 150, the windows 150 are aligned with a periodic feature of the component. One or more implements, tools, and/or devices may be inserted into the extension tool 100, individually (e.g., in a sequential order) or in combination with one another, to perform inspection, maintenance, cleaning, servicing, repair, or other activities. Further, one or more fluids may flow along one or more passages defined in the extension tool 100, at the same time as the one or more implements, tools, and/or devices are inserted into the tool 100 or before or after the implements, tools, and/or devices are within the tool 100. After completion of activities involving the extension tool 100, the tool 100 may be returned to its slack position (FIG. 1) and removed from the component.

It will be appreciated that, although examples of the present subject matter are described herein with respect to an aeronautical gas turbine engine, particularly a turbofan engine, the present subject matter could be used in other environments as well. For example, the extension tool 100 described herein may be used in other gas turbine engines, such as a turboshaft, turboprop, or turbojet gas turbine engine, including marine and industrial engines and auxiliary power units. As further examples, the extension tool 100 described herein may be used for inspection, maintenance, cleaning, and/or other activities in tanks, pressure vessels, or the like, e.g., in oil and gas applications. The present subject matter may have other applications as well.

Accordingly, the present subject matter is directed to selectively flexible extension tools, which also may be referred to as selectively rigidizable guide tubes due to an internal passage defined therein. As described herein, an extension tool is relatively flexible when not rigidized, which enables the extension tool to be moved into position prior to tensioning or rigidization. This invention provides a wheel at a tip or distal end of the extension tool, described herein as a support member, that is biased or offset from a centerline of the extension tool. Such a wheeled tip or distal end helps positively control an insertion direction of the extension tool, e.g., a circumferential direction of insertion of the extension tool following radial insertion through a port, which facilitates insertion of relatively long extension tools into gas turbine engine combustors, annuli between gas turbine engine rotors and stators, through borescope ports, and even directed upward against gravity. Further, by providing the support member as part of the extension tool, whether the support member is a removable or permanent feature of the extension tool, the wheeled tip or distal end provides a solution to directing the tip of the extension tool that requires no special or additional process steps and no control inputs to make it work. The support member biases the tip of the extension tool in the direction the support member is oriented in and is intuitive to use. Moreover, the support member is internal to the cross-section of the extension tool, eliminating the snag risk inherent to, e.g., external strings, other external apparatus, or the like that may be used to manipulate the tip of an extension tool, and eliminating additional shaping members that may otherwise be required to control the tip deployment direction of the extension tool. Still further, the wheel arrangement can be printed in place as part of the extension tool distal link or as a separate, removable member, ensuring security of the wheel components. Multiple wheels can be printed into one assembly, e.g., to reduce friction with component features such as the inner liner of a gas turbine engine combustor and to guide the rotation of the links into a circumferential position. The distal wheel may then guide the extension tool against an outer surface, e.g., the outer liner of a gas turbine engine combustor, when the slack or floppy extension tool droops as it traverses the circumference.

As further described herein, the inventors have recognized that the inclusion of one or more windows in the body of an extension tool or rigidizable guide tubes provides a stable support structure (e.g., to guide borescopes for inspection; to direct fluids for maintenance, repair, or cleaning; etc.) with the ability to achieve fine control of position. For example, a plurality of windows defined in the extension tool provides a wider range of controllability, e.g., of the position of borescopes for inspection at multiple circumferential positions within annular spaces such as combustors. Further, the invention as described herein enables consistent lighting and imaging of features such as fuel nozzles, deflectors, turbine nozzle airfoils, etc., with consistent stand-off and positioning. Moreover, articulation of the extension tool through an access hole or port enables relative motion of the extension tool for follow-up, e.g., where fuel nozzle cracks are identified and need to be traced. Still further, the extension tool as described herein can facilitate precise steering of an inspection tip, e.g., using the sight lines and/or window labels as described herein, and can also facilitate reduced inspection time. Other benefits and advantages of the present subject matter may be realized as well.

Further aspects of the invention are provided by the subject matter of the following clauses:

1. An extension tool having a proximal end and a distal end, the extension tool comprising a plurality of sequentially arranged links moveable relative to one another; and a support member defining the distal end, the support member including a first wheel disposed at the distal end and a second wheel spaced apart from the first wheel.

2. The extension tool of any preceding clause, wherein the plurality of sequentially arranged links includes a distal link, and wherein the distal link is the support member such that the distal link defines the distal end and includes the first wheel and the second wheel.

3. The extension tool of any preceding clause, wherein each of the first wheel and the second wheel is attached to the distal link.

4. The extension tool of any preceding claim, wherein each of the first wheel and the second wheel is integrally formed with the distal link.

5. The extension tool of any preceding clause, wherein the support member is removably coupled to the plurality of sequentially arranged links such that the first wheel and the second wheel are removable from the extension tool.

6. The extension tool of any preceding clause, wherein the support member comprises a first flexible member for extending through the plurality of links and a second flexible member disposed between the first wheel and the second wheel.

7. The extension tool of any preceding clause, wherein the plurality of sequentially arranged links defines an opening for receipt of the support member, the opening having a perimeter defined by the plurality of sequentially arranged links, and wherein the support member comprises a location feature for cooperating with the perimeter to position the first wheel and the second wheel in a pre-determined orientation.

8. The extension tool of any preceding clause, wherein the location feature further comprises an endstop for restricting travel of the support member through the plurality of sequentially arranged links when the first wheel and the second wheel are disposed distal to a distal link of the plurality of sequentially arranged links.

9. The extension tool of any preceding clause, wherein the support member extends along a support member longitudinal centerline such that a support member distal end is biased away from the support member longitudinal centerline.

10. The extension tool of any preceding clause, further comprising a plurality of windows defined in the plurality of sequentially arranged links, wherein the windows of the plurality of windows are defined periodically along the plurality of sequentially arranged links such that a periodicity of the widows corresponds to a periodicity of a feature of a component into which the extension tool is deployed.

11. An extension tool for deployment within a component comprising a plurality of sequentially arranged links moveable relative to one another; and a plurality of windows defined in the plurality of sequentially arranged links, wherein the windows of the plurality of windows are defined periodically along the plurality of sequentially arranged links such that a periodicity of the widows corresponds to a periodicity of a plurality of features of the component.

12. The extension tool of any preceding clause, wherein a window of the plurality of windows is defined at one or more circumferential locations along a link of the plurality of sequentially arranged links, and wherein the window of the plurality of windows defines an opening in the link of the plurality of sequentially arranged links for communication between an internal passage of the plurality of sequentially arranged links and an environment external to the extension tool.

13. The extension tool of any preceding clause, wherein each window of the plurality of windows is labeled with a label, and wherein each label corresponds to a respective feature of the plurality of features.

14. The extension tool of any preceding clause, wherein each window of the plurality of windows is defined by diverging walls.

15. The extension tool of any preceding clause, wherein a sight line is defined in each link of the plurality of sequentially arranged links, the sight line extending between each window of the plurality of windows arranged along a path to position each window at a respective feature of the plurality of features.

16. The extension tool of any preceding clause, wherein each link of the plurality of sequentially arranged links comprises a link proximal end and a link distal end, the link distal end of each link of the plurality of sequentially arranged links having an elongated hooked nose and the link proximal end of each link of the plurality of sequentially arranged links having a shape complementary to the elongated hooked nose.

17. The extension tool of any preceding clause, wherein the plurality of sequentially arranged links includes a transition link defining a first line guide segment in a wall of the transition link and a second line guide segment in the wall, wherein the first line guide segment transitions from an upper portion of the wall at a proximal end of the transition link to a lower portion of the wall at a distal end of the transition link, and wherein the second line guide segment transitions from the lower portion of the wall at the proximal end of the transition link to the upper portion of the wall at the distal end of the transition link.

18. The extension tool of any preceding clause, wherein the plurality of sequentially arranged links includes a light element for illuminating an environment external to the plurality of sequentially arranged links.

19. The extension tool of any preceding clause, wherein the plurality of sequentially arranged links includes a cooling passage for receipt of a cooling fluid within the plurality of sequentially arranged links.

20. The extension tool of any preceding clause, further comprising a support member defining a distal end of the extension tool, the support member including a first wheel disposed at the distal end and a second wheel spaced apart from the first wheel.

21. A method of inserting an extension tool into a component, the extension tool comprising a plurality of sequentially arranged links moveable relative to one another and a support member comprising at least two wheels, the method comprising inserting a support member defining a distal end of the extension tool through a port in the component; pushing the extension tool to direct the plurality of sequentially arranged links through the port; and tensioning the extension tool such that the extension tool assumes a pre-determined shape.

22. The method of any preceding clause, wherein the support member guides the plurality of sequentially arranged links through the component as the extension tool is pushed through the port.

23. The method of any preceding clause, wherein the extension tool is tensioned manually.

24. The method of any preceding clause, wherein the extension tool is tensioned automatically.

25. The method of any preceding clause, further comprising inserting a borescope into a passage defined through the plurality of sequentially arranged links.

26. The method of any preceding clause, guiding the borescope to a window of a plurality of windows defined periodically in the extension tool to view a feature of the component.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An extension tool having a proximal end and a distal end, the extension tool comprising:
    a plurality of sequentially arranged links moveable relative to one another; and
    a support member defining the distal end, the support member including a first wheel disposed at the distal end and a second wheel spaced apart from the first wheel, wherein the first wheel and the second wheel are substantially in line with the plurality of sequentially arranged links, and
    wherein the distal end includes a curved tip such that the first wheel extends away from a longitudinal centerline, and wherein the second wheel is substantially in line with the longitudinal centerline.

2. The extension tool of claim 1, wherein the plurality of sequentially arranged links includes a distal link, and wherein the distal link is the support member such that the distal link defines the distal end and includes the first wheel and the second wheel.

3. The extension tool of claim 2, wherein each of the first wheel and the second wheel is attached to the distal link.

4. The extension tool of claim 3, wherein each of the first wheel and the second wheel is integrally formed with the distal link.

5. The extension tool of claim 1, wherein the support member is removably coupled to the plurality of sequentially arranged links such that the first wheel and the second wheel are removable from the extension tool.

6. The extension tool of claim 5, wherein the support member comprises:
    a first flexible member for extending through the plurality of sequentially arranged links; and
    a second flexible member disposed between the first wheel and the second wheel.

7. The extension tool of claim 5, wherein the plurality of sequentially arranged links defines an opening for receipt of the support member, the opening having a perimeter defined by the plurality of sequentially arranged links, and wherein the support member comprises a location feature for cooperating with the perimeter to position the first wheel and the second wheel in a pre-determined orientation.

8. The extension tool of claim 7, wherein the location feature further comprises an endstop for restricting travel of the support member through the plurality of sequentially arranged links when the first wheel and the second wheel are disposed distal to a distal link of the plurality of sequentially arranged links.

9. The extension tool of claim 1, further comprising:
    a plurality of windows defined in the plurality of sequentially arranged links,
    wherein the windows of the plurality of windows are defined periodically along the plurality of sequentially arranged links such that a periodicity of the windows of the plurality of windows corresponds to a periodicity of a feature of a component into which the extension tool is deployed.

10. An extension tool for deployment within a component, comprising:
    a plurality of sequentially arranged links moveable relative to one another; and
    a plurality of windows defined in the plurality of sequentially arranged links,
    wherein the windows of the plurality of windows are defined periodically along the plurality of sequentially arranged links such that a periodicity of the windows of the plurality of windows corresponds to a periodicity of a plurality of features of the component.

11. The extension tool of claim 10, wherein a window of the plurality of windows is defined at one or more circumferential locations along a link of the plurality of sequentially arranged links, and wherein the window of the plurality of windows defines an opening in the link of the plurality of sequentially arranged links for communication between an internal passage of the plurality of sequentially arranged links and an environment external to the extension tool.

12. The extension tool of claim 10, wherein each window of the plurality of windows is labeled with a label, and wherein each label corresponds to a respective feature of the plurality of features.

13. The extension tool of claim 10, wherein each window of the plurality of windows is defined by diverging walls.

14. The extension tool of claim 10, wherein a sight line is defined in each link of the plurality of sequentially arranged links, the sight line extending between each window of the plurality of windows arranged along a path to position each window at a respective feature of the plurality of features.

15. The extension tool of claim 10, wherein each link of the plurality of sequentially arranged links comprises a link proximal end and a link distal end, the link distal end of each link of the plurality of sequentially arranged links having a male alignment feature and the link proximal end of each link of the plurality of sequentially arranged links having a complementary female alignment feature.

16. The extension tool of claim 10, wherein the plurality of sequentially arranged links includes a transition link defining a first line guide segment in a wall of the transition link and a second line guide segment in the wall, wherein the first line guide segment transitions from an upper portion of the wall at a proximal end of the transition link to a lower portion of the wall at a distal end of the transition link, and wherein the second line guide segment transitions from the lower portion of the wall at the proximal end of the transition link to the upper portion of the wall at the distal end of the transition link.

17. The extension tool of claim 10, wherein the plurality of sequentially arranged links includes a light element for illuminating an environment external to the plurality of sequentially arranged links.

18. The extension tool of claim 10, wherein the plurality of sequentially arranged links includes a cooling passage for receipt of a cooling fluid within the plurality of sequentially arranged links.

19. The extension tool of claim 10, further comprising:
a support member defining a distal end of the extension tool, the support member including a first wheel disposed at the distal end and a second wheel spaced apart from the first wheel.

20. An extension tool having a proximal end and a distal end, the extension tool comprising:
a plurality of sequentially arranged links moveable relative to one another; and
a support member defining the distal end, the support member including a first wheel disposed at the distal end and a second wheel spaced apart from the first wheel,
wherein the support member is removably coupled to the plurality of sequentially arranged links such that the first wheel and the second wheel are removable from the extension tool,
wherein the support member comprises:
a first flexible member for extending through the plurality of sequentially arranged links; and
a second flexible member disposed between the first wheel and the second wheel.

\* \* \* \* \*

UNITED STATES PATENT AND TRADEMARK OFFICE
CERTIFICATE OF CORRECTION

| | |
|---|---|
| PATENT NO. | : 11,654,547 B2 |
| APPLICATION NO. | : 17/219577 |
| DATED | : May 23, 2023 |
| INVENTOR(S) | : Andrew Crispin Graham et al. |

It is certified that error appears in the above-identified patent and that said Letters Patent is hereby corrected as shown below:

On the Title Page

Column 2, beside "Primary Examiner", Line 1, delete "Jake Cook" and insert -- William Jake Cook --, therefor.

Column 2, in item [57], under "ABSTRACT", Line 10, delete "widows" and insert -- windows --, therefor.

Page 2, Column 1, in item (56), under "U.S. PATENT DOCUMENTS", Line 2, delete "Hagelthom" and insert -- Hagelthorn --, therefor.

Signed and Sealed this
Third Day of September, 2024

Katherine Kelly Vidal
*Director of the United States Patent and Trademark Office*